United States Patent
Nabetani

(10) Patent No.: US 10,187,110 B2
(45) Date of Patent: Jan. 22, 2019

(54) WIRELESS COMMUNICATION DEVICE AND WIRELESS COMMUNICATION METHOD

(71) Applicant: KABUSHIKI KAISHA TOSHIBA, Minato-ku, Tokyo (JP)

(72) Inventor: Toshihisa Nabetani, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/701,634

(22) Filed: Sep. 12, 2017

(65) Prior Publication Data

US 2018/0262232 A1    Sep. 13, 2018

(30) Foreign Application Priority Data

Mar. 13, 2017    (JP) .................................. 2017-047607

(51) Int. Cl.
  *H04W 4/00* (2018.01)
  *H04B 1/525* (2015.01)
  (Continued)

(52) U.S. Cl.
  CPC .......... *H04B 1/525* (2013.01); *H04B 7/0626* (2013.01); *H04L 5/1461* (2013.01); *H04B 1/1081* (2013.01); *H04W 16/14* (2013.01)

(58) Field of Classification Search
  None
  See application file for complete search history.

(56) References Cited

U.S. PATENT DOCUMENTS

| | | | |
|---|---|---|---|
| 6,765,529 B2 * | 7/2004 | Doi ........................ | H04B 7/084 342/368 |
| 7,274,951 B2 * | 9/2007 | Maruta .................... | H01Q 3/26 342/368 |

(Continued)

FOREIGN PATENT DOCUMENTS

| | | |
|---|---|---|
| EP | 2 547 155 A1 | 1/2013 |
| EP | 2 632 209 A2 | 8/2013 |

(Continued)

OTHER PUBLICATIONS

D. Bharadia, et al.; "Full Duplex Radios," in Proc. ACM SIGCOM, pp. 375-386, 2013.

(Continued)

*Primary Examiner* — Tuan A Tran
(74) *Attorney, Agent, or Firm* — Foley & Lardner LLP

(57) ABSTRACT

According to one embodiment, a wireless communication device includes a receiver and controlling circuitry. The receiver receives a first frame transmitted by a first wireless communication device in a predetermined frequency band. The controlling circuitry performs channel estimation based on the first frame to acquire channel information between the first wireless communication device and the wireless communication device. The receiver receives a second frame transmitted by a second wireless communication device. The controlling circuitry calculates, using the channel information, weight coefficients for a plurality of antennas to suppress reception of a signal from the first wireless communication device. The receiver receives, using the weight coefficients, a third frame transmitted in the predetermined frequency band from the second wireless communication device after a predetermined time from transmission of the second

19 Claims, 17 Drawing Sheets

(51) Int. Cl.
*H04L 5/14* (2006.01)
*H04B 7/06* (2006.01)
*H04B 1/10* (2006.01)
*H04W 16/14* (2009.01)

(56) References Cited

U.S. PATENT DOCUMENTS

| | | | | |
|---|---|---|---|---|
| 8,064,407 | B2* | 11/2011 | Wang | H04B 1/7105 342/373 |
| 8,374,132 | B2* | 2/2013 | Miura | H04B 7/0851 370/329 |
| 8,742,983 | B2* | 6/2014 | Suzuki | G01S 7/292 342/189 |
| 8,805,300 | B2* | 8/2014 | Alrabadi | H04B 7/0413 343/700 MS |
| 8,874,047 | B2* | 10/2014 | Alrabadi | H04B 1/525 343/700 MS |
| 9,197,297 | B2* | 11/2015 | Agee | H04B 7/0413 |
| 2002/0136179 | A1* | 9/2002 | Aoyama | H01Q 3/26 370/335 |
| 2004/0022205 | A1* | 2/2004 | Miyata | H04W 88/08 370/319 |
| 2005/0153657 | A1* | 7/2005 | Maruta | H01Q 3/26 455/63.4 |
| 2007/0070267 | A1 | 3/2007 | Yang | |
| 2015/0244619 | A1 | 8/2015 | Zheng et al. | |
| 2016/0309478 | A1 | 10/2016 | Nabetani et al. | |
| 2017/0026162 | A1 | 1/2017 | Nabetani et al. | |
| 2017/0150492 | A1 | 5/2017 | Ozaki | |
| 2018/0062269 | A1 | 3/2018 | Kishimoto et al. | |

FOREIGN PATENT DOCUMENTS

| | | |
|---|---|---|
| JP | 2017-510109 A | 4/2017 |
| JP | 2018-037732 A | 3/2018 |
| WO | WO-2005/041443 A1 | 5/2005 |
| WO | WO-2016/024356 A1 | 2/2016 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

* cited by examiner

| TERMINAL ID | ESTIMATED CSI | WEIGHT COEFFICIENT |
|---|---|---|
| ○○○ (TERMINAL 1) | XXXXXX | W1 |
| △△△ (TERMINAL 3) | OXOXOX | W3 |
| ⋮ | | |
| ××× (TERMINAL N) | XOXOXO | Wn |

FIG.10

| TERMINAL ID | ANTENNA PATTERN |
|---|---|
| ○○○ (TERMINAL 1) | 3 |
| △△△ (TERMINAL 3) | 1 |
| ⋮ | |
| ××× (TERMINAL N) | 4 |

FIG.14

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2017-047607, filed on Mar. 13, 2017, the entire contents of which are incorporated herein by reference.

FIELD

Embodiments described herein relate to a wireless communication device and a wireless communication method.

BACKGROUND

As a technique for improving system throughputs in an environment where numerous terminals exist, the technique of full-duplex communications has been investigated. In full-duplex communications, one terminal simultaneously carries out transmission and reception using the same frequency, so that it is possible to increase the efficiency of utilization of time resources when compared with conventional half-duplex communications. Specifically, increase in the throughput can be expected by up to double.

A problem associated with full-duplex communications is that a signal to be transmitted may enter the receiver's side in a roundabout manner via a certain path in the terminal itself that transmits the signal, causing self-interference with respect to a signal to be received. In general, a signal to be transmitted is transmitted at a large level relative to that of a signal to be received which is received in an attenuated state. As a result, the self-interference level due to introduction of unwanted signal is relatively large when compared with the level of the signal to be received. As a result, the signal to be received is likely not received correctly due to the self-interference acting as the factor. Here, receiving correctly a signal in this context means, for example, that a signal is received with a reception quality (signal-to-interference-plus-noise ratio (SINR), etc.) ensuring that the signal can be received at or below a certain frame error rate.

Also, in realizing full duplex communications, not only self-interference but also inter-terminal interference can be a problem. Inter-terminal interference refers to interference given by a signal transmitted from a terminal that performs uplink transmission to a terminal that performs downlink reception.

The above-mentioned self-interference and inter-terminal interference cause decrease in the throughput of the system in realizing the full duplex communications.

BRIEF DESCRIPTION OF THE DRAWINGS

FIG. 10 is a diagram illustrating another example of the information table;
FIG. 14 is a diagram illustrating an example of an antenna table.

DETAILED DESCRIPTION

According to one embodiment, a wireless communication device includes a receiver and controlling circuitry. The receiver receives a first frame transmitted by a first wireless communication device in a predetermined frequency band. The controlling circuitry performs channel estimation based on the first frame to acquire channel information between the first wireless communication device and the wireless communication device. The receiver receives a second frame transmitted by a second wireless communication device. The controlling circuitry calculates, using the channel information, weight coefficients for a plurality of antennas to suppress reception of a signal from the first wireless communication device. The receiver receives, using the weight coefficients, a third frame transmitted in the predetermined frequency band from the second wireless communication device after a predetermined time from transmission of the second frame.

IEEE Std 802.11™-2012 and IEEE Std 802.11ac™-2013, which are known as wireless LAN standards, are hereby incorporated by reference in their entirety.

Below, embodiments will be described below with reference to the drawings.

(First Embodiment)

Figure 1:
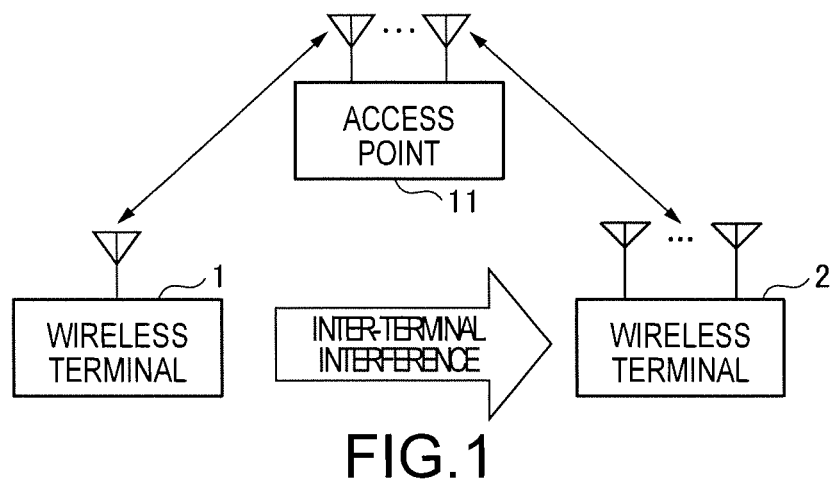
FIG. 1 is a diagram illustrating a wireless communication system according to a first embodiment.

FIG. 1 illustrates a wireless communication system according to this embodiment. The wireless communication system is a wireless local area network (LAN) that includes a base station (hereinafter referred to as "access point (AP) 11") and a plurality of wireless terminals (hereinafter referred to as "terminal 1" and "terminal 2").

The access point 11 is also a terminal in one mode of implementation but differs from the terminals 1 and 2 in that the access point 11 has a relay function or the like. Although it is assumed here that the access point 11, the terminals 1 and 2 perform communications according to the IEEE 802.11 standard, communications may be performed according to other communication schemes. The access point 11 includes one or more antennas. For the sake of simplicity, only two wireless terminals (terminals 1 and 2) are illustrated in FIG. 1, but more terminals may exist in the network.

The access point 11 is equipped with a wireless communication device that transmits and receives a MAC frame (which may be hereinafter simply indicated as "frame") via an antenna. The wireless communication device includes a wireless communicator configured to transmit and receive a signal wirelessly and a controller, controlling circuitry or communication control device configured to control communications by transmitting and receiving frames via the wireless communicator. The access point 11 forms, for example, a wireless communication group which is a basic service set (BSS) according to the IEEE 802.11 standard. The access point 11 establishes a wireless link with the terminals 1 and 2 by performing a process called an association process prior to transmission and reception. The state in which the wireless link is established is expressed as being connected to the access point 11. The access point 11 communicates with the terminals 1 and 2 by the wireless communicator. However, the access point 11 only needs to be able to communicate with the terminals 1 and 2, and the access point 11 may not necessarily have a function as an access point defined in accordance with the IEEE 802.11 standard. In that case, the access point 11 can be regarded as a relay station that relays communications between the terminals 1 and 2.

The terminal 1 includes one or more antennas. The terminal 1 is equipped with a wireless communication device that transmits and receives frames via the one or more antennas. The wireless communication device includes a wireless communicator configured to transmit and receive a signal wirelessly and a controller, controlling circuitry or communication control device that controls communications by transmitting and receiving frames via the wireless communicator.

The terminal 2 includes a plurality of antennas. The terminal 2 is equipped with a wireless communication device configured to transmit and receive frames via the antennas. The wireless communication device includes a wireless communicator configured to transmit and receive signals wirelessly and a controller, controlling circuitry or a communication control device configured to control communications by transmitting and receiving frames via the wireless communicator.

The access point 11 may be further connected to a network different than the wireless network to which the terminals 1 and 2 belong. The different network may be a wired network, a wireless network, or a hybrid network including wired and wireless features.

The access point 11 is capable of executing full-duplex communications according to this embodiment and executing, simultaneously in the same frequency band (same channel), frame reception from the terminal 1 and frame transmission to the terminal 2. Alternatively, reception of a frame from the terminal 2 by the access point 11 and transmission of a frame from the access point 11 to the terminal 1 may be performed simultaneously in the same frequency band.

It should be noted that the access point 11 has a mechanism for canceling a self-interference signal generated in the access point 11 itself at the time of the full-duplex communication. Specifically, a signal may be unwantedly introduced from the receiver into the transmitter of the access point 11 or signal reflection occurs in the course of the full-duplex communication, which causes, as a self-interference signal, degradation of the characteristics of the received signal. The access point 11 has the mechanism for canceling such a self-interference signal.

As will be described later, one of the features of the terminal 2 according to this embodiment lies in the fact that it performs reception beamforming for directing a null toward the terminal 1 (suppressing reception of a signal from the terminal 1) at the time of full-duplex communication, and thereby improves reception quality of a signal received by downlink communication from the access point 11.

According to this embodiment, a MAC frame (frame) is transmitted and received as communication. More specifically, a physical packet with a physical header (PHY header) added to the frame is transmitted and received. In the following description, the phraseology of "to transmit or receive a frame" or the like indicates that a physical packet including a frame is actually transmitted or received. In addition, in the following description, any reference to the "length of the frame" or the "frame length" may be construed as the length of the physical packet including the frame or the packet length.

Figure 2A:
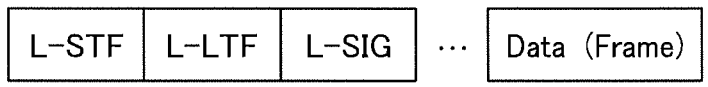
FIG. 2A is a diagram illustrating a configuration example of a physical packet.

FIG. 2A illustrates a schematic configuration example of a physical packet. The physical packet includes a physical header and a frame added to the end of the physical header. As an example, the physical header includes L-STF (Legacy-Short Training Field), L-LTF (Legacy-Long Training Field) and L-SIG (Legacy Signal Field) defined in accordance with the IEEE 802.11 standard. L-STF, L-LTF, and L-SIG are fields that can be recognized by terminals of legacy standards such as IEEE 802.11 b/a/n/ac and the like, and pieces of information such as information for signal detection, information for frequency correction (or reception power measurement or propagation path estimation), transmission rate (MCS (Modulation and Coding Scheme)), and the like are stored therein. L-STF and L-LTF constitute a legacy preamble part. Fields other than those mentioned herein may be included.

Figure 2B:
FIG. 2B is a diagram illustrating a configuration example of a physical packet.

FIG. 2B illustrates another configuration example of the physical packet. After the L-SIG field, a SIGNAL field and a preamble part (preamble field) different than a legacy preamble are arranged. In the SIGNAL field, information to be notified to the terminal is set according to the standard in use. The information to be notified to the terminal may include, by way of example, information of the MCS applied to the payload frame. I information for channel estimation, reception power measurement, frequency correction, or the like may be set in the different preamble part.

Figure 3A:
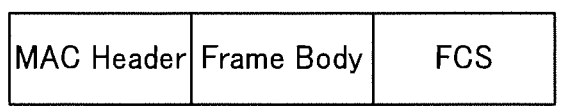
FIG. 3A is a diagram illustrating a format example of a MAC frame.
Figure 3B:
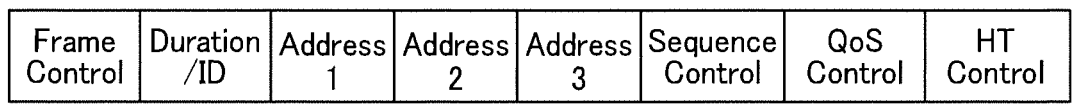
FIG. 3B is a diagram illustrating a format example of a MAC header.

FIG. 3A illustrates an example of a basic format of a MAC frame. This frame format includes fields of MAC header, frame body, and FCS. As illustrated in FIG. 3B, the MAC header includes fields of Frame Control, Duration/ID, Address 1, Address 2, Address 3, Sequence Control, QoS Control, and HT (High Throughput) control.

All of these fields need not necessarily be provided and some of these fields may not be provided. For example, the Address 3 field may not be provided. In addition, there may be cases in which either or both of QoS Control and HT Control fields do not exist. There may be cases where the frame body field does not exist. On the other hand, other fields not illustrated in FIG. 3B may also be provided. For example, an Address 4 field may be additionally provided. The HT Control field may be expanded to other fields depending on the standard in use.

A receiver address (RA) is entered in the field of Address 1, a transmitter address (TA) is entered in the field of Address 2, and a BSSID (Basic Service Set IDentifier) which is an identifier of a basic service set (BSS) (which may be a wildcard BSSID covering all BSSIDs with all the bits set to 1) or a TA is entered in the field of Address 3 depending upon the purpose of the frame.

The Frame Control field includes two fields of Type and Subtype. Rough discrimination of the frame type of whether it is a data frame, a management frame, or a control frame is performed based on the Type field, and more specific discrimination of the roughly discriminated frames is performed based on the Subtype field.

The Duration/ID field describes a medium reservation time, and it is determined that the medium is virtually busy from the end of the physical packet including the MAC frame to the medium reservation time when a MAC frame addressed to another terminal has been received. The Sequence Control field stores the sequence number of the frame and the like. The QoS field is used to perform QoS control such that transmission is performed taking into consideration the priority of the frames. The HT Control field is a field introduced by IEEE 802.11n.

FCS (Frame Check Sequence) information is set in the FCS field as a checksum code used in frame error detection at the receiving side. As an example of the FCS information, CRC (Cyclic Redundancy Check) may be mentioned.

Figure 4:
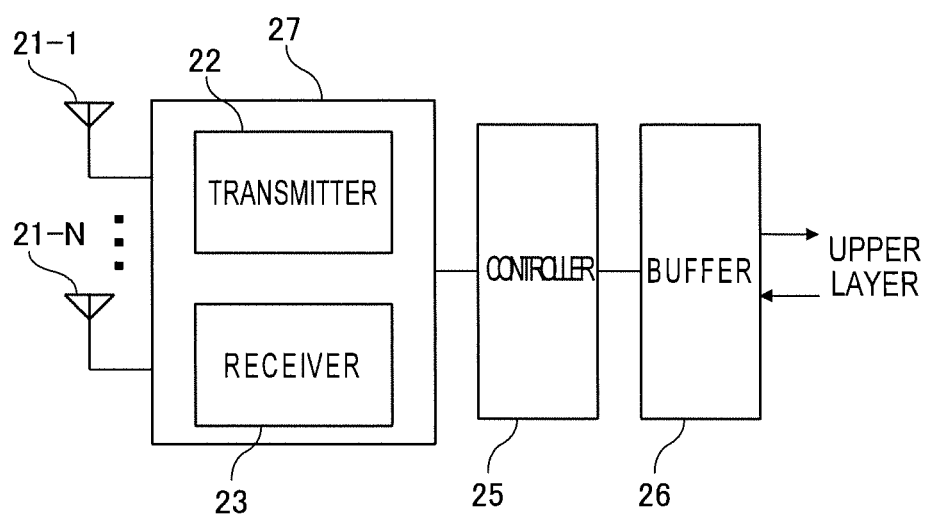
FIG. 4 is a functional block diagram of a wireless communication device in an access point according to the first embodiment.

FIG. 4 is a functional block diagram of the wireless communication device in the access point 11 according to this embodiment. The wireless communication device according to this embodiment can carry out full-duplex communication in which transmission and reception of signals are performed in the same frequency band at the same timing (in parallel with each other).

The wireless communication device in FIG. 4 includes at least one antenna 21-1 to 21-N (where N is an integer equal to or larger than 1), a wireless communicator 27, a controller (controlling circuitry) 25, and a buffer 26. The wireless communicator 27 includes a transmitter 22 and a receiver 23.

The wireless communicator 27 includes a self-interference cancellation function. In the case where a plurality of antennas are provided, these antennas may be separately provided for transmission and reception purposes in the form of a transmission antenna and a reception antenna, or may be used in a shared manner for transmission and reception. When used in a shared manner for both transmission and reception, the connection destination of the antenna may be switched by a switch.

The individual processes in the individual blocks may be performed by software (programs) run on a processor such as a CPU and the like, by hardware, or by combination of software and hardware resources. In addition, the processes in the blocks may be performed based on analog processing, digital processing, or combination of analog processing and digital processing.

The controller 25 mainly performs processing of the MAC layer and part of processing of the physical layer. In addition, the controller 25 manages the MAC layer and the physical layer and stores information necessary for the management in a buffer inside or outside the controller 25. Information on the terminal connected to the access point 11 and information on the access point as such may also be managed with this buffer. The buffer may be a memory or a device such as an SSD or a hard disk. In the case of a memory, it may be a nonvolatile memory such as DRAM or a nonvolatile memory such as NAND or MRAM. The buffer may be the same storage medium as the buffer 26 described later or may be any other storage medium.

When data or information to be transmitted exists, the controller 25 generates a frame including the data or information, acquires permission for transmission in accordance with the communication method in use, and transmits the frame via the transmitter 22. The permission for transmission corresponds to the permission to access a wireless medium. As an example, when carrier sensing is performed based on CSMA/CA (Carrier Sense Multiple Access with Collision Avoidance) and the permission for transmission is acquired with the wireless medium being idle, then a frame (more specifically, a physical packet obtained by adding a physical header to a frame) is transmitted to the transmitter 22 with a TXOP (Transmission Opportunity) based on the permission for transmission. The TXOP corresponds to the time during which a wireless medium can be occupied. It is also possible to add part or the entire physical header by the transmitter 22. The controller 25 may output to the transmitter 22 a signal indicative of at least one of the transmission rate (MCS) or the transmission power applied to the frame.

The transmitter 22 codes and modulates the packet delivered from the controller 25, subjects the packet to digital-to-analog (DA) conversion, extracts a signal component of a desired band from an analog signal, and amplifies the extracted signal with by an amplifier. The transmitter 22 then transmits the amplified signal via the antennas 21-1 to 21-N. When MCS is specified by the controller 25, the transmitter 22 performs coding and modulation of the packet on the basis of the MCS. In addition, when the transmission power is instructed by the controller 25, the transmitter 22 adjusts the operation of the amplifier for transmission with the transmission power that has been instructed. When the MCS applied to the frame is set in the physical header of the packet, the transmitter 22 may perform coding and modulation based on the MCS set in the physical header.

The receiver 23 amplifies the signal received by the antenna 21-1 to 21-N with a low noise amplifier (LNA), subjects the amplified signal to frequency conversion (down-conversion), and extracts a desired band component by filtering processing. The receiver 23 converts the extracted signal into a digital signal by analog-to-digital (AD) conversion, subjects the digital signal to demodulation, error correction decoding, and processing of the physical header, and inputs the frame to the controller 25. Processing of all or a part of the physical header may be performed by the controller 25.

When a frame necessitating an acknowledgment response has been received, the controller 25 generates an acknowledgment response frame (ACK frame, BA (Block Ack)

frame, etc.) according to a result of checking of the received frame, and transmits the generated acknowledgment response frame via the transmitter 22.

The controller 25 performs various control processes associated with full-duplex communications according to this embodiment. For example, switching control between full-duplex communications and half-duplex communications, and selection control to select a terminal with which communications should be made are performed. Also, the controller 25 controls the transmission power and the transmission rate with respect to the terminals.

The buffer 26 is used as a storage area for exchanging data between the upper layer and the controller 25. Also, the buffer 26 may temporarily store data included in a frame that has been received from the terminal for relaying it to another terminal. In addition, when a frame addressed to this terminal has been received, the buffer 26 may temporarily store the data in the frame for passing it to the upper layer. The upper layer performs processing associated with the communication protocols higher than the MAC layer managed by the controller 25 such as TCP/ IP or UDP/IP. Also, in addition to TCP/IP or UDP/IP, the upper layer may perform processing for the application layer. The operation of the upper layer may be performed by processing of software (programs) by a processor such as a CPU, by hardware, or by combination of software and hardware resources.

The self-interference cancellation function provided in the wireless communicator 27 performs cancellation processing of a self-interference signal occurring in the device itself at the time of full-duplex communication. During full-duplex communication, a signal goes from the transmitter 22 to the receiver 23, which becomes a self-interference signal acting as a factor that causes deterioration in the characteristics of the received signal. When full-duplex communication is performed, specifically, when transmission and reception are performed at the same time, a part of the transmission signal is mixed in the signal received by the antenna 21-1 to 21-N, and the mixed signal may be input to the receiver 23. The self-interference cancellation function removes the self-interference signal, i.e., an unwanted transmission signal that is introduced via the transmitter 22 into the receiver 23.

One method of removing the self-interference signal is to provide a circuit for ensuring isolation between the transmitter 22 and the receiver 23 so that the transmission signal is not introduced into the receiver 23. In this case, the self-interference cancellation function is arranged as a circuit for isolation.

Another method of removing the self-interference signal is to provide a path for inputting the transmission signal output from the transmitter 22 in a wired or wireless manner to the receiver 23 or a circuit at the preceding stage thereof, and subtracting the transmission signal input from the path from a mixture of the reception signal and the self-interference signal. In this case, the self-interference cancellation function includes a circuit that includes the path and is configured to subtract the transmission signal from the mixed signal.

The self-interference cancellation function can also remove the self-interference signal from the mixed signal by a method other than the one described herein.

When the controller 25 has determined that full-duplex communication is to be performed at a certain timing, the controller 25 may transmit, prior to the full-duplex communication, a trigger frame (hereinafter referred to as "FD trigger frame") via the transmitter 22 to the terminal (hereinafter referred to as "terminal 1") that is made to perform uplink transmission and to the terminal (hereinafter referred to as "terminal 2") that is made to perform downlink reception. The FD trigger frame is a frame whose purpose is to synchronize the timings of the full-duplex uplink transmission and the full-duplex downlink transmission performed by the access point itself.

Figure 5:
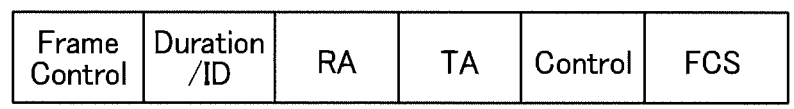
FIG. 5 is a diagram illustrating a format example of an FD trigger frame.

FIG. 5 illustrates an example format of the FD trigger frame. For example, the type of the FD trigger frame may be a value representing "Control," and the value of the subtype may be newly defined. The Control field includes a field for specifying a terminal given permission to perform full-duplex uplink transmission and a field for specifying a terminal as the target of full-duplex downlink reception. The controller 25 sets the identifier of the corresponding terminal (MAC address, association ID, or any other value) in these fields. Note that a configuration is also possible in which the field for specifying a terminal as the target of downlink reception is not included in the Control field.

Also, a field for setting parameter information to be notified to or specified for a terminal given permission to perform uplink transmission, a field for setting parameter information to be notified to or specified for a terminal as a target of downlink reception may be included in the Control field. Examples of the parameter information for a terminal given permission to perform uplink transmission include an MCS, a frame length, a transmission power, and the like to be applied to a data frame to be transmitted by uplink transmission by a terminal given permission to perform uplink transmission. Also, examples of the parameter information for the downlink target terminal include an MCS, a frame length, a transmission power, and the like to be applied to the data frame transmitted by downlink transmission to the terminal 2.

The Control field may exist in the MAC header or in the frame body field. The name of the Control field is an example, and other field names such as "Information" may be used.

The receiver address (RA) of the FD trigger frame is usually a broadcast address or a multicast address. However, the receiver address (RA) of the FD trigger frame may be the address of the terminal that is made to perform full-duplex uplink transmission (in this case, the FD trigger frame is transmitted by a unicast scheme to the terminal). In the case of the unicast transmission, a terminal other than the terminal as the destination of the FD trigger frame (the terminal 2 of this embodiment) is supposed to check whether or not the terminal itself is specified as the target of downlink reception. In addition, in the case where the address of the terminal that is made to perform full-duplex uplink transmission is the receiver address, the Control field may not include a field specifying a terminal given permission to perform full-duplex uplink transmission.

Each terminal that has received the FD trigger frame checks the Control field in the FD trigger frame to recognize whether or not the terminal itself is the one given permission to perform full-duplex uplink transmission and whether or not the terminal itself is the target of full-duplex downlink reception. When the terminal itself is the one that has been given permission to perform full-duplex uplink transmission, the terminal (terminal 1 in this case) transmits a frame (e.g., a data frame) to the access point 11 which is specified as the destination after the lapse of a predetermined time from the reception of the FD trigger frame. The predetermined fixed time period may be an SIFS (Short InterFrame Space) or IFS which is longer or shorter than that.

The controller 25 of the access point 11 receives by uplink reception the frame from the terminal 1 after the lapse of a predetermined fixed time (e.g., SIFS) from the transmission of the FD trigger frame, and at the same time transmits by downlink transmission the frame to the terminal specified as the target of downlink reception (the terminal 2 in this case).

Also, the terminal 2 specified as the target of the full-duplex downlink reception by the FD trigger frame waits for a frame transmitted from the access point 11 and addressed to the terminal 2. The terminal 2 receives the frame transmitted from the access point 11 after the lapse of a predetermined fixed time (e.g., SIFS) after reception of the FD trigger frame.

Figure 6:
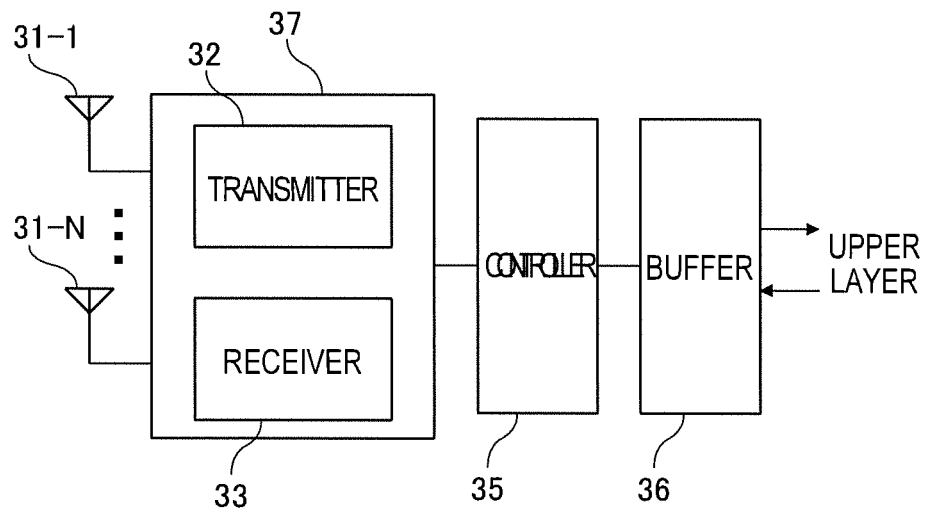
FIG. 6 is a diagram illustrating a configuration example of functional blocks of the wireless communication device in a terminal according to a first embodiment.

FIG. 6 illustrates a configuration example of functional blocks of the wireless communication device in the terminal 2 according to this embodiment. The wireless communication device in FIG. 6 includes at least antennas 31-1 to 31-N (where N is an integer of 2 or more), a wireless communicator 37, a controller (controlling circuitry) 35, and a buffer 36. The wireless communicator 37 includes a transmitter 32 and a receiver 33.

The antennas 31-1 to 31-N may be separately provided for transmission and reception as a transmission antenna and a reception antenna, or may be used in a shared manner for transmission and reception. When used in a shared manner for both transmission and reception, the connection destination of the antenna may be switched by a switch.

The individual processes in the individual blocks may be performed by software (programs) run on a processor such as a CPU and the like, by hardware, or by combination of software and hardware resources. In addition, the processes in the blocks may be performed based on analog processing, digital processing, or combination of analog processing and digital processing.

The controller 35 is configured to control communications and mainly performs processing of the MAC layer and part of processing of the physical layer. As a specific example of communication control, the controller 35 performs control processing such as transmission power control and transmission rate control in the communications with the access point 11. Also, the controller 35 performs control processing associated with full-duplex communication which is one of the features of this embodiment (details of which will be described later). Further, the controller 35 performs management of the MAC layer and the physical layer and stores information necessary for the management in a buffer inside or outside the controller 35. Information on the access point 11 and information on the terminal itself may also be managed with this buffer. This buffer may be a memory or a device such as an SSD or a hard disk. In the case of a memory, it may be a nonvolatile memory such as DRAM or a nonvolatile memory such as NAND or MRAM. This buffer may be the same storage medium as the buffer 36 or may be a different storage medium.

When data or information to be transmitted exists, the controller 35 generates a frame including the data or the information, acquires permission for transmission according to the communications scheme in use, and transmits the frame via the transmitter 32. The permission for transmission corresponds to the permission to access a wireless medium. As an example, when carrier sensing is performed based on CSMA/CA (Carrier Sense Multiple Access with Collision Avoidance) and the permission for transmission is acquired with the wireless medium being idle, then a frame (more specifically, a physical packet obtained by adding a physical header to a frame) is transmitted to the transmitter 32 with a TXOP (Transmission Opportunity) based on the permission for transmission. The TXOP corresponds to the time during which a wireless medium can be occupied. It is also possible to add part or the entire physical header by the transmitter 32. The controller 35 may output to the transmitter 32 a signal indicative of at least one of the transmission rate (MCS) or the transmission power applied to the frame.

The transmitter 32 codes and modulates the packet delivered from the controller 35, subjects the packet to digital-to-analog (DA) conversion, extracts a signal component of a desired band from the analog signal, and amplifies the extracted signal by an amplifier. The transmitter 32 then transmits the amplified signal via the antennas 31-1 to 31-N. When an MCS is specified by the controller 35, the transmitter 32 performs coding and modulation of the packet on the basis of the specified MCS. In addition, when the transmission power is instructed by the controller 35, the transmitter 32 adjusts the operation of the amplifier for transmission with the transmission power that has been instructed. When the MCS applied to the frame is set in the physical header of the packet, the transmitter 32 may perform coding and modulation based on the MCS set in the physical header.

The receiver 33 amplifies the signal received by the antenna with a low noise amplifier (LNA), subjects the amplified signal to frequency conversion (down-conversion), and extracts a desired band component by filtering processing. The receiver 33 converts the extracted signal into a digital signal by analog-to-digital (AD) conversion, subjects the digital signal to demodulation, error correction decoding, and processing of the physical header, and inputs the frame to the controller 35. Processing of all or a part of the physical header may be performed by the controller 35.

The buffer 36 is used as a storage area for exchanging data between the upper layer(s) and the controller 35. When a frame addressed to the terminal itself is received, the data in the frame may be temporarily stored in the buffer 36 so as to be passed to the upper layer(s). The upper layer performs processing associated with the communication protocols higher than the MAC layer managed by the controller 35 such as TCP/IP or UDP/IP. Also, in addition to TCP/IP or UDP/IP, the upper layer may perform processing for the application layer. The operation of the upper layer may be performed by processing of software (programs) by a processor such as a CPU, by hardware, or by combination of software and hardware resources.

When the FD trigger frame is received from the access point 11 via the receiver 33, the controller 35 waits for reception of the frame (the data frame in this case). The controller 35 receives via the receiver 33 the data frame transmitted after a predetermined time (e.g., after SIFS) from transmission of the FD trigger frame.

The configuration of the terminal 1 may be the same as that of the terminal 2 or may be a so-called legacy terminal (more specifically, a terminal conforming to, for example, IEEE 802.11 b/a/n/ac). However, it is necessary for the terminal 1 to be able to interpret the FD trigger frame transmitted from the access point 11 and execute the operation according to the result of the interpretation.

An operation example of the control processing associated with full-duplex communication by the controller 35 of the terminal 2 according to this embodiment will be described below.

Figure 7:
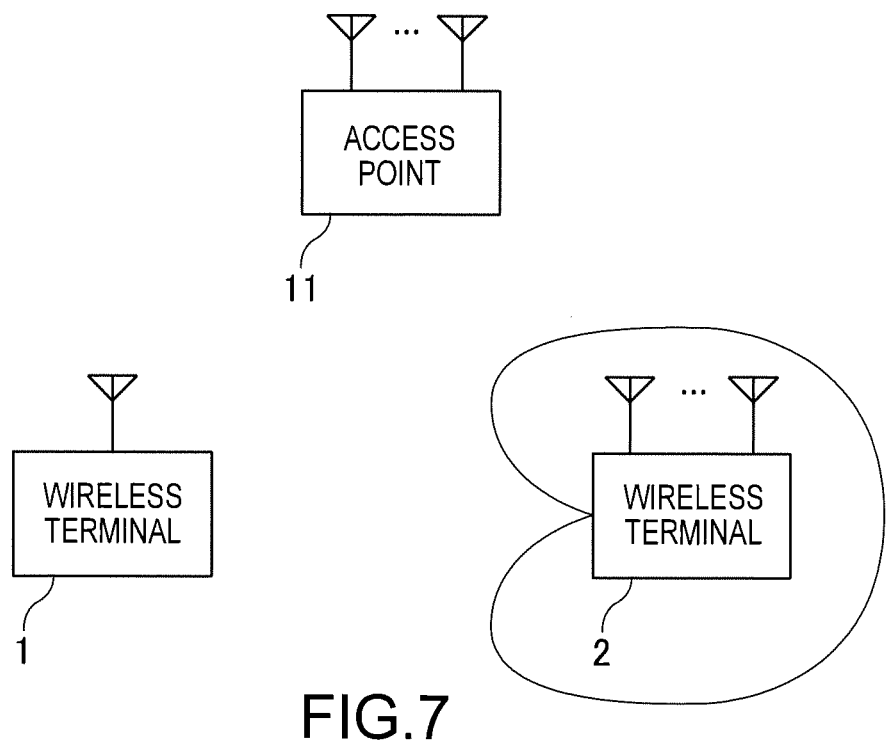
FIG. 7 is a diagram illustrating an example of a directional pattern.

As illustrated in FIG. 1, in the full-duplex communication, when a signal that the terminal 1 transmits by uplink transmission to the access point 11 reaches the terminal 2, the signal causes interference (inter-terminal interference) with the downlink signal that the terminal 2 receives from the access point 11. In view of this, the controller 35 of the terminal 2 uses the plurality of antennas 31-1 to 31-N to receive the downlink signal addressed to the terminal 2 itself from the access point 11 in the full-duplex communication, and carries out reception beamforming processing for directionality control that directs a null toward the terminal 1. By virtue of this, the terminal 2 receives the full-duplex communication downlink signal addressed to the terminal 2 itself from the access point 11 while eliminating or minimizing the interference caused by the terminal 1. FIG. 7 illustrates an example of a directional pattern when the directionality control for directing a null toward the terminal 1 is performed.

Details of the reception beamforming processing will be described below. The terminal 2 receives the frame that a peripheral terminal has transmitted to the access point 11 by opportunistic listening (opportunistic reception), and carries out estimation (channel estimation) of the wireless channel between the terminal that has transmitted the frame and the terminal 2 itself for each of the plurality of antennas provided in the terminal 2 using the known signal sequence (preamble) section in the physical header of the received frame. In channel estimation, for example, amplitude variation and phase variation are calculated. As a result, channel state information (CSI) between the terminal that has made the transmission and the terminal 2 itself is acquired. Opportunistic listening means frame reception by a certain terminal to receive a frame addressed to a destination other than the certain terminal. However, it may further include frame reception by the certain terminal to receive a frame addressed to the certain terminal and transmitted from another terminal, when it is possible to communicate with another terminal with direct link and the like.

In the case of FIG. 1, although only the terminal 1 exists as a peripheral terminal, there may be a case where a plurality of other terminals not illustrated in FIG. 1 exist in an actual wireless network. The terminal 2 receives a frame or frames that can be received by the terminal 2 itself (of the reception power receivable by the terminal 2 itself) among the frames transmitted by a plurality of peripheral terminals including the terminal 1, and carries out the channel estimation. The range of frames to be subjected to the channel estimation may be limited. For example, the channel estimation may only be performed for frames addressed to the access point 11.

The terminal 2 holds the CSI estimated on the basis of the received frame in a storage device such as a memory device in the terminal 2 in association with the terminal ID of the terminal that has transmitted the same received frame. The specific terminal from which the frame at issue is transmitted can be recognized by checking the MAC header of the received frame, more specifically, the Address 2 field (TA field) in the MAC header. The terminal ID may be the MAC address as such stored in the Address 2 field or other information for identifying a terminal. If a frame from a plurality of peripheral terminals can be received, the terminal 2 holds the CSIs between the peripheral terminals and the terminal 2 along with their respective terminal IDs.

Figures 8, 9:
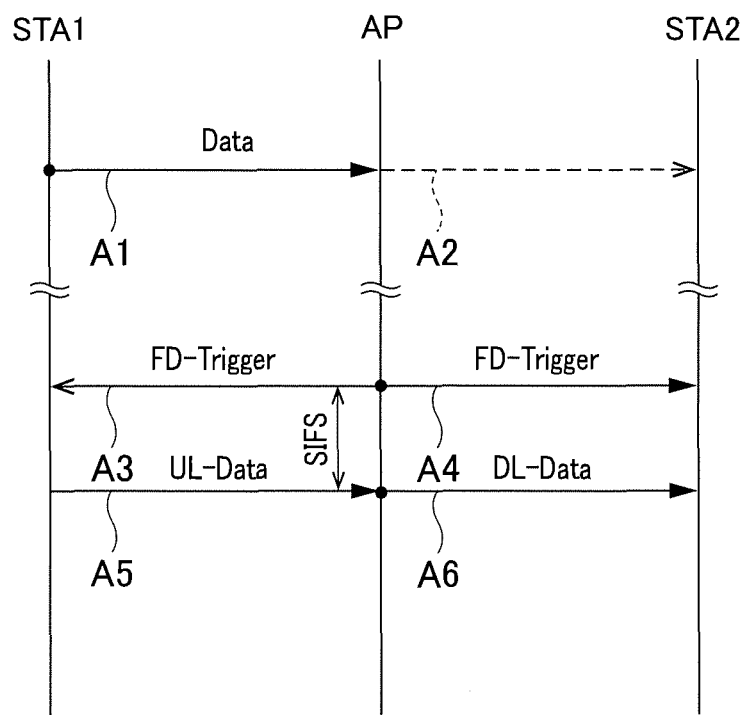
FIG. 8 is a diagram illustrating an example of an information table.
FIG. 9 is a diagram illustrating an example of a frame sequence according to the first embodiment.

FIG. 8 illustrates an example of content stored in the memory device. An example of an information table that stores the terminal IDs and the pieces of CSI is illustrated. In the information table, pairs (entries) of one terminal ID and one piece of CSI are held by the number of terminals from which the frames were able to be received. However, it is also possible to define the upper limit of the number of terminals to be held without holding the pieces of CSI for all the terminals from which the frames were able to be received considering memory restriction or the like, and hold the pieces of CSI by the number of terminals not larger than the upper limit.

In this case, when the terminal 2 has received a new frame from another terminal after having held the pieces of CSI corresponding to the upper limit number, then the terminal 2 discards the CSI of the terminal without holding it or discard the CSI of the oldest terminal, the newly obtained CSI of the terminal may be held. Also, the CSI estimated from a frame transmitted by a specific terminal may not be held. For example, a method may be considered according to which CSI regarding a terminal that does not support full-duplex communications is not held in the memory device.

Each terminal sets information on whether or not it supports full-duplex communication in the Capability field of the management frame or the like to be transmitted when associating with the access point 11. Accordingly, by checking the field, the terminal 2 can recognize whether or not each terminal is compatible with full-duplex communication.

It should be noted, as described above, that the frame subjected to CSI estimation and thus held may be a frame transmitted to the access point 11, a frame addressed to a terminal other than the access point 11, or a frame transmitted in a broadcast scheme. There is no restriction either upon the frame type, and it may be a data frame, a management frame, or a control frame. Further, it may be either a frame transmitted as full-duplex uplink communication or a frame transmitted by normal uplink communication that does not use full-duplex communication. In other words, the CSI between another terminal and the terminal 2 itself can be estimated as long as it is known that the received frame is a frame transmitted by the other terminal. At this point, the CSI estimation is performed regardless of the frame type and the destination of the frame.

In addition, frame transmissions by peripheral terminals are usually carried out many times irrespective of whether they take place periodically or randomly. As a result, the terminal 2 will also receive frames many times from the same terminal. With regard to the frames received from the same terminal, the terminal 2 may only hold a piece of CSI estimated from the most recently received frame. Accordingly, each time the terminal 2 receives a frame from the same terminal, the terminal 2 may update the entry of the terminal in the information table at any time with the most recently estimated CSI.

In this manner, the terminal 2 according to this embodiment estimates and holds the wireless channel between the peripheral terminal and the terminal 2 itself in advance by receiving the frame transmitted by the peripheral terminal by opportunistic listening. Then, CSI is updated at any time in accordance with subsequent frame reception. By virtue of the opportunistic listening, it is not necessary to exchange frames for estimating the wireless channel between the terminal 2 and the peripheral terminal, and the overhead associated with such frame exchange does not occur.

Meanwhile, exchanging frames for estimating the wireless channel between the terminal 2 and peripheral terminals is not excluded. For example, the terminal 2 transmits a notification frame instructing a peripheral terminal to transmit a frame for channel estimation, and the peripheral terminal that has received the notification frame transmits a frame for channel estimation to the terminal 2. The terminal 2 receives the frame for channel estimation and estimates the CSI. Further, another method may be used according to which the terminal 2 transmits the frame for channel estimation to peripheral terminals the respective peripheral terminals that have received the frame for channel estimation estimate their respective channels with the terminal 2 and feed the estimated pieces of CSI back to the terminal 2.

Overhead is generated in these cases, but in this case as well, as will be described below, it is possible to receive the frame transmitted by full-duplex downlink transmission while reducing the interference of the signals transmitted from peripheral terminals and receive the signals by performing reception beamforming at the time of the downlink reception of full-duplex communication.

The following describes an operation example of the terminal 2 in the case where the access point 11 specifies the terminal 1 as a terminal given permission to perform full-duplex uplink transmission, specifies the terminal 2 as a target terminal of the full-duplex downlink reception, and transmits an FD trigger frame to the terminal 2.

The terminal 2 receives and analyzes the FD trigger frame and thereby recognizes that the terminal 2 is the reception target of the full-duplex downlink frame and that the terminal 1 is the terminal performing the full-duplex uplink transmission. Specifically, the terminal 2 recognizes the fact that the terminal 1 is going to perform the full-duplex uplink transmission to the access point 11 after the lapse of SIFS from the completion of reception of the FD trigger frame. The terminal 2 refers to the piece of CSI corresponding to the terminal 1 from the pieces of CSI of the terminals held in the information table in the terminal 2 itself. The terminal 2 calculates a weight coefficient for each antenna to be applied to the reception signals of the antennas 31-1 to 31-N at the time of full-duplex downlink reception from the access point 11 by using the piece of CSI that has been referred to. When the terminal 2 receives a frame transmitted by full-duplex downlink transmission from the access point 11, the terminal 2 is allowed to receive the frame in a state where a directional beam is formed that directs a null toward the terminal 1 (carries out reception beamforming) by applying the calculated weight coefficients.

Here, any method may be used to calculate the weight coefficients for the respective antennas for forming a directional beam that forms a null with respect to the terminal 1. For example, a known method such as a ZF (Zero Forcing) method or an MMSE (Minimum Mean Square Error) method can be used while using the CSI in relation to the terminal 1. In any case, when the terminal 2 performs full-duplex downlink reception, the terminal 2 carries out the reception beamforming for directing a null toward the terminal 1 and thereby can prevent or reduce the influence of the interference signal from the terminal 1 performing the full-duplex uplink transmission at the same timing. As a result, the terminal 2 is allowed to highly reliably receive the full-duplex downlink frame addressed to the terminal 2 itself.

On the other hand, when the terminal 2 has received the FD trigger frame from the access point 11 and recognized that the terminal 2 itself is not the target of the full-duplex downlink reception, the terminal 2 does not need to receive any frame, so that the terminal 2 does not carry out the reception beamforming. Accordingly, it is not necessary to calculate the weight coefficients. Specifically, the terminal 2 receives the FD trigger frame and thereby perform determination of whether or not frame reception with application of reception beamforming after the lapse of SIFS should be carried out. Meanwhile, when a configuration is adopted in which the FD trigger frame does not have a field for specifying a terminal that performs downlink reception, the terminal 2 may carry out the reception beamforming, receive a frame transmitted by downlink transmission from the access point 11, and check whether or not the received frame is addressed to the terminal 2 itself.

FIG. 9 illustrates an example of a frame sequence according to this embodiment. An appropriate frame ("Data" in the figure) is transmitted from the terminal 1 (STA 1 in the figure) to the access point (AP in the figure) (A1). The terminal 2 receives this frame by opportunistic listening (A2), estimates the wireless channel to the terminal 1 by using the preamble of the physical header of the received frame, and acquires the channel information (CSI). After that, when the terminal 2 receives a frame from the terminal 1 or another terminal, the terminal 2 in the same manner estimates the CSI. The terminal 2 stores in the information table an entry in which the estimated CSI is associated with the terminal ID of the terminal. In the case where multiple frames are received from the same terminal, the entry of the terminal at issue may be updated by the CSI estimated from the latest frame.

The access point 11 generates at any appropriate timing an FD trigger frame ("FD-Trigger" in the figure) specifying the terminal 1 as the terminal given permission to perform full-duplex uplink transmission and specifying the terminal 2 as the target of full-duplex downlink reception, and transmits the FD trigger frame by a broadcast scheme.

The terminals 1 and 2 receive the FD trigger frames (A3, A4), respectively. By analyzing the FD trigger frame, the terminal 1 recognizes the fact that the terminal 1 has been given the permission to perform full-duplex uplink transmission. By analyzing the other FD trigger frame, the terminal 2 recognizes the fact that the terminal 2 has been specified as the target of full-duplex downlink reception and the fact that the terminal 1 is the terminal given the permission to perform the full-duplex uplink transmission.

The terminal 2 acquires the CSI corresponding to the terminal 1 from the information table, and calculates, on the basis of the acquired CSI, the weight coefficients for respective antennas for carrying out reception beamforming that forms the directional beam that directs a null toward the terminal 1. As illustrated in FIG. 10, a column for weight coefficients may be created in the information table, and the weight coefficients may be calculated in advance and stored in the information table. In the example of FIG. 10, the weight coefficient of the terminal 1 is schematically represented as a vector W1, the weight coefficient of the terminal 3 as a vector W3, and so forth. When the weight coefficients are stored in the information table, the weight coefficients should be read directly from the information table, in place of the CSI. This configuration is effective when calculation of the weight coefficients cannot be timely performed during the time period from reception of the FD trigger frame to start of the full-duplex communication.

The terminal 1 transmits a data frame to the access point 11 after the SIFS from the completion of reception of the FD trigger frame (A5). The access point 11 also transmits the data frame to the terminal 2 after the SIFS from the completion of the transmission of the FD trigger frame (A6). In short, full-duplex communication is performed. The access point 11 receives the data frame transmitted by uplink transmission from the terminal 1. At this point, since the interference caused by the signal transmitted by downlink transmission by the access point 11 itself is reduced by the aforementioned self-interference cancellation function, the reception signal of the data frame can be correctly demodulated.

In the meantime, the terminal 2 performs reception processing of a data frame transmitted by downlink transmission from the access point 11 by applying the weight coefficients for the respective antennas. Specifically, the terminal 2 forms a directional beam that directs a null toward the signal transmitted from the terminal 1. As a result, the influence of the interference due to the signal from the terminal 1 is reduced, and the data frame from the access point 11 can be reliably received.

Figure 11:
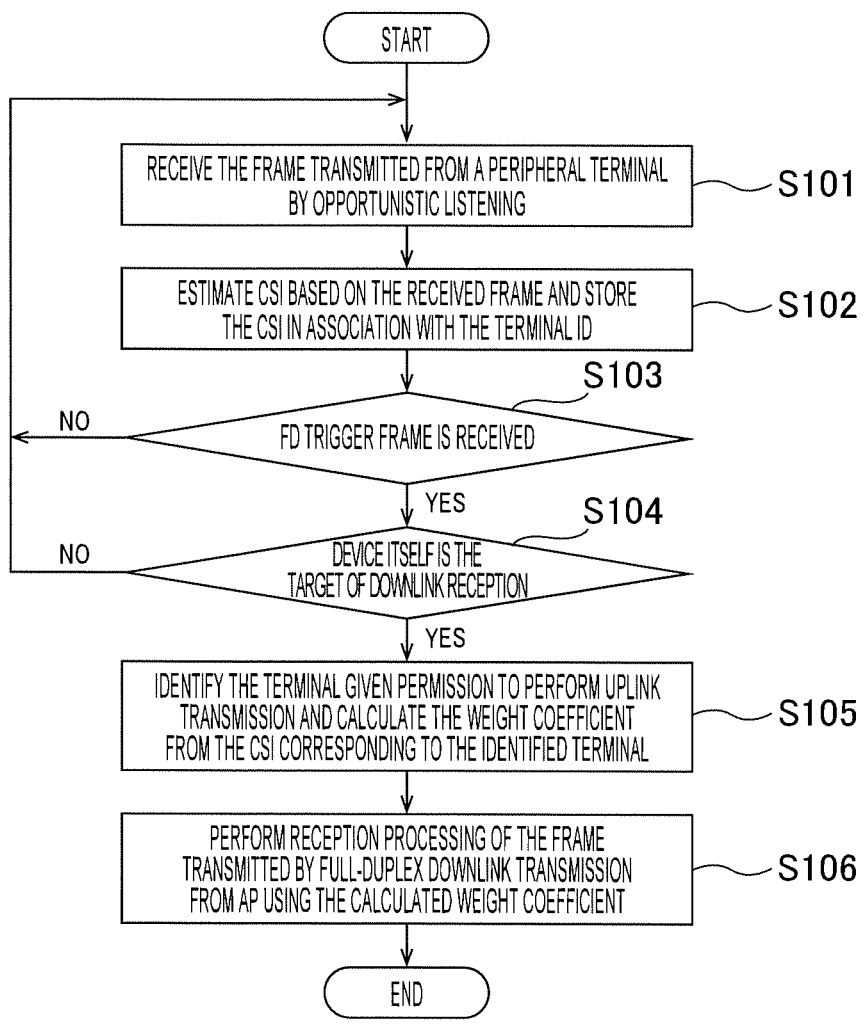
FIG. 11 is a flowchart of the operation of the terminal according to the first embodiment.

FIG. 11 is a flowchart of the operation of the terminal 2 according to this embodiment. The terminal 2 receives a frame transmitted from a peripheral terminal by opportunistic listening (S101). The terminal 2 estimates the wireless channel based on the received frame, acquires channel information (CSI), and stores it in the information table in association with the terminal ID of the terminal (S102). Prior to receiving the FD trigger frame from the access point 11, the terminal 2 repeats this operation (NO in S103).

When the terminal 2 receives an FD trigger frame from the access point 11 (YES in S103), the terminal 2 analyzes the FD trigger frame, thereby checking whether or not the terminal 2 itself is specified as the target of full-duplex downlink reception (S104). When the terminal 2 itself is not specified as the target (NO in S104), the process goes back to the step S101 and reception by opportunistic listening is performed.

On the other hand, if the terminal 2 is specified as the target of the full-duplex downlink reception (YES in S104), the terminal 2 identifies a terminal given permission to perform full-duplex uplink transmission on the basis of the result of analysis of the FD trigger frame (S105). The terminal 2 then acquires, from the information table, the CSI corresponding to the terminal that has been identified, and the terminal 2 calculates the weight coefficients for the respective antennas for performing reception beamforming for forming a directional beam that directs a null toward the identified terminal on the basis of the acquired CSI (step S105).

The terminal 2 receives the data frame transmitted by downlink transmission from the access point 11 after the SIFS since reception of the FD trigger frame was completed. The reception processing of this data frame is performed by applying the weight coefficients for respective antennas (S106). As a result, a directional beam is formed that directs a null toward a signal that is transmitted by uplink transmission from the identified terminal, so that the influence of the interference due to the signal from the identified terminal is reduced. Accordingly, it is made possible to highly reliably receive the data frame from the access point 11.

As has been described above, the terminal 2 according to this embodiment determines whether or not application of the reception beamforming should be made and an application timing thereof by receiving the FD trigger frame transmitted by the access point 11, and identifies from the information table the CSI for the terminal 1 which performs the full-duplex uplink transmission. Then the terminal 2 carries out the reception beamforming by applying the weight coefficients calculated from the CSI so that a null is directed toward the signal transmitted by the terminal 1 performing the full-duplex uplink transmission. This makes it possible to receive frames transmitted by full-duplex downlink transmission while suppressing the influence of the interference caused by the terminal performing the full-duplex uplink transmission. In addition, according to this embodiment, since CSI is estimated and held using the frame received by opportunistic listening, there is no need to perform frame exchange (transmission and reception) causing overhead in order to acquire CSI.

There may be a case in which the terminal that has been specified by the access point 11 by the FD trigger frame as having the permission to perform the full-duplex uplink transmission does not exist in the vicinity of the terminal 2. In such a case, there is a possibility that the terminal 2 has not received the frame from the terminal at issue with opportunistic listening and accordingly does not hold the CSI of the terminal at issue. In this case, the terminal 2 cannot apply the reception beamforming to the terminal at issue. However, the fact that the frame from the terminal at issue cannot be received therefrom with opportunistic listening (the frame cannot reach the terminal 2) means that the full-duplex uplink signal from the terminal at issue cannot cause interference with the terminal 2, so that no problem is raised therefrom.

(Second Embodiment)

According to the first embodiment, the reception beamforming is carried out with the directional pattern that directs a null toward the terminal 1. In contrast, according to this embodiment, a null is directed toward the terminal 1 and further reception beamforming is carried out for forming a beam having a directional gain with respect to the access point 11 (i.e., with respect to the frame transmitted by full-duplex downlink transmission from the access point 11).

Figure 12:
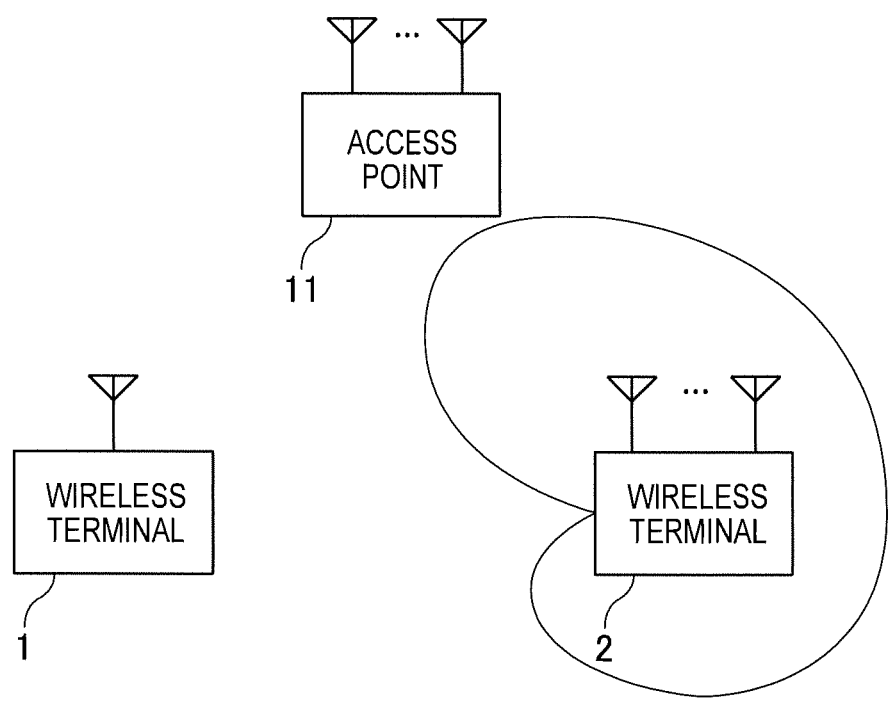
FIG. 12 is a diagram illustrating another example of the directional pattern.

More specifically, not only the CSI of the terminal 1 but also the CSI of the access point 11 is used, so that the weight coefficients are calculated to perform the reception beamforming that directs a null in the direction of the terminal 1 but forms a directional beam allowing a gain to be obtained in the direction of the access point 11, and the full-duplex downlink frame is received using the calculated weight coefficients. FIG. 12 illustrates an example of a directional pattern obtained when directionality control is performed such that a null is directed toward the terminal 1 and a directional beam in which a gain is obtained in the direction of the access point 11 is formed.

The frame sequence diagram according to this embodiment is the same as in FIG. 9. Explanations overlapping with those in relation to FIG. 9 will not be repeated. The terminal 2 according to this embodiment receives a FD trigger frame from the access point 11 (A4) and, when the terminal 2 detects the fact that the terminal 2 is the target of reception of the full-duplex downlink frame, the terminal 2 estimates the CSI between the access point 11 and the terminal 2 using the known signal sequence (preamble) section included in the physical header of the FD trigger frame that has been received. The terminal 2 may store the estimated CSI in a storage device such as a memory device.

Thereafter, the terminal 2 calculates weight coefficients by using both the CSI relative to the terminal 1 held in the information table of the memory device and the CSI relative to the access point 11 obtained by the FD trigger frame.

As the calculation policy for calculating the weight coefficients at this point, it is assumed here that the calculation is to be performed such that the weight coefficients ensure that a null is formed in the direction toward the terminal 1 on one hand and a reception directional beam that can obtain a gain is formed in the direction toward the access point 11. Any appropriate method may be used as the calculation method for calculating the weight coefficients as long as it is capable of forming the above-described beam directionality. For example, known methods such as the ZF (Zero Forcing) method and the MMSE (Minimum Mean Square Error) method can be used.

The terminal 2 carries out such reception beamforming and thereby receives the full-duplex downlink frame addressed to the terminal 2 and sent from the access point 11 with a high gain while preventing the influence of the interference caused by the terminal 1 that performs the full-duplex uplink transmission (A6).

Figure 13:
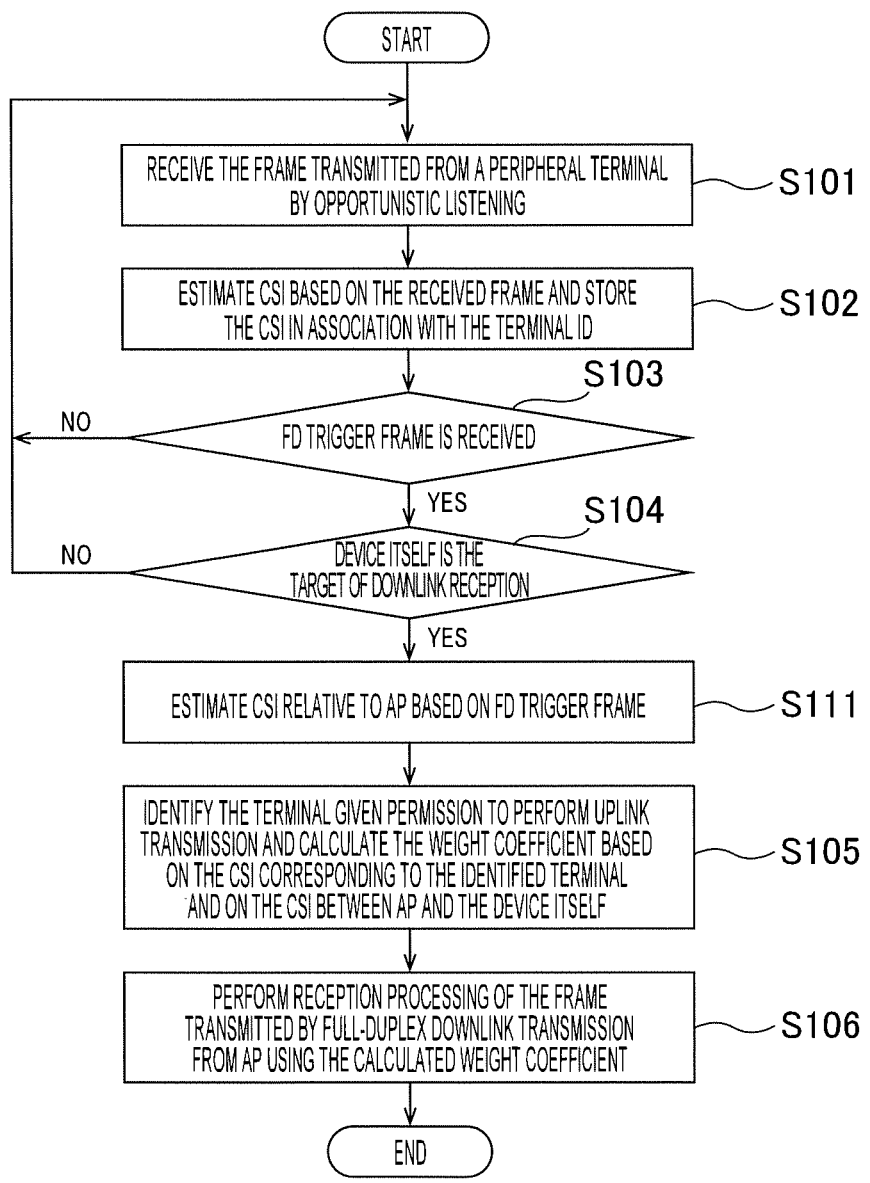
FIG. 13 is a flowchart of the operation of the terminal according to a second embodiment.

FIG. 13 is a flowchart of the operation of the terminal 2 according to this embodiment. The steps S101 to S104 are the same as those in FIG. 11.

When the terminal 2 receives an FD trigger frame from the access point 11 and detects the fact that the terminal 2 itself is specified as the target of full-duplex downlink reception (YES in S104), then the terminal 2 estimates the CSI between the access point 11 and the terminal 2 on the basis of the preamble section included in the physical header of the FD trigger frame (S111).

The terminal 2 identifies the terminal given permission to perform full-duplex uplink transmission on the basis of the result of analysis of the FD trigger frame, and calculates the weight coefficients on a per-antenna basis on the basis of the CSI corresponding to the identified terminal and the CSI between the access point 11 and the terminal 2 itself (step S112). The terminal 2 calculates the weight coefficients for carrying out the reception beamforming that directs a null toward the identified terminal and forms a reception directional beam that can obtain a gain in the direction toward the access point 11.

The terminal 2 receives a data frame transmitted by downlink transmission from the access point 11 after the SIFS since reception of the FD trigger frame was completed. The reception of this data frame is performed using the weight coefficients for the respective antennas calculated in the step S112 (S106). As a result, a directional beam with a null directed toward a signal to be transmitted by uplink transmission from the specified terminal is formed, and a reception directional beam in which a gain is obtained in the direction of the access point 11 is formed. Accordingly, it is made possible for the terminal 2 to receive the downlink frame addressed to the terminal 2 itself from the access point 11 with a high gain while preventing the influence of the interference from the terminal 1.

(Third Embodiment)

According to the first and second embodiments, the terminal 2 controls the reception directionality by performing reception beamforming. According to this embodiment, the terminal 2 controls the reception directionality by using a variable directional antenna instead of the reception beamforming. The configuration of the block diagram of the terminal 2 is different from that of the first and second embodiments in that the plurality of antennas 31-1 to 31-N are replaced by variable directional antennas. One single antenna or any appropriate number of antennas may be provided as long as they are variable directional antennas. The variable directional antennas may have any appropriate configuration. As an example, the antenna may be configured by forming a plurality of slots in the conductor board and providing a plurality of switch elements to select which slot should be brought into electrical connection. For example, when the slot is rectangular, the two opposing long sides of the rectangular slot are connected by a switch element. The directionality of the antenna can be made variable by combination of turning on and turning off of the switch elements. To bring the slot into electrical connection means, for example, to turn on a switch, which means connecting the two opposing long sides of the slot is brought into connection via the slot. The configuration of the variable directional antenna described here is merely an example and other configurations may be relied on.

According to the first and second embodiments, the terminal 2 receives a frame transmitted by a terminal existing in the vicinity thereof, estimates the wireless channel, and stores the CSI obtained by the estimation, which is associated with the terminal ID, in the memory device in order to perform reception beamforming. According to the third embodiment, instead of estimating the CSI, the terminal 2 changes the pattern of the variable directional antenna (antenna pattern or directional pattern), and the terminal 2 receives the frames transmitted from the terminals existing in the vicinity of the terminal 2 with each of the plurality of antenna patterns.

For example, if the number of antenna patterns is four, the terminal 2 switches among four patterns, performs frame reception by opportunistic listening, and measures the reception power with each pattern. The antenna patterns may be switched while receiving one frame, and the reception power at each antenna pattern may be measured by receiving one frame. Alternatively, during reception of one frame, measurement of reception power may be performed using only one pattern. In the latter case, if the antenna pattern is, for example, four patterns, then the terminal 2 needs to receive at least four frames per terminal. With regard to the measurement of the reception power, for example, the total reception power of a plurality of antennas may be measured at fixed time intervals during the measurement period, and the average of the total values may be adopted. Alternatively, another index such as a maximum value, a minimum value, or a median may be adopted among a plurality of total reception powers measured at fixed time intervals. Measurement may be made by methods other than those mentioned herein. The terminal 2 demodulates the received frame in parallel with the measurement of the reception power and identifies the terminal ID of the transmission source terminal from the Address 2 field (TA field) and the like.

When the terminal 2 switches the antenna patterns while receiving one frame, the terminal 2 may wait for the frame with an omni-directional antenna pattern, and, when reception of the frame is started, the terminal 2 may use the antenna pattern as it is until the reception of the Address 2 field is completed, and may switch the remaining antenna patterns thereafter one at a time. By virtue of this, since it is possible to prevent application of such an antenna pattern that cause formation of a null for the transmission source terminal at the time of reception of the Address 2 field, the terminal ID of the frame transmission source can be reliably identified.

As described above, the terminal 2 changes the antenna patterns for each terminal by using the frame transmitted by the terminal existing in its vicinity to perform reception, measures the reception power with each antenna pattern, and determines the antenna pattern with which the reception power is the smallest. The terminal 2 stores the value representing the determined antenna pattern in the antenna table in the memory device in association with the terminal ID of the terminal.

FIG. 14 illustrates an example of the antenna table held by the terminal 2 in its memory device. The number of each antenna pattern is associated with the terminal ID of each terminal. In the example of the figure, with regard to the frame transmitted by the terminal 1, the reception power of the antenna pattern 3 is the smallest on the terminal 2; with regard to the frame transmitted by the terminal 3, the reception power of the antenna pattern 1 is the smallest; and with regard to the frame transmitted by the terminal n, the reception power of the antenna pattern 4 is the smallest. In other words, the antenna patterns held in the antenna table are antenna patterns with which the reception power becomes the smallest at the time of receiving the frames transmitted by respective terminals.

The terminal 2 may measure the reception power with each antenna pattern for a plurality of times for each peripheral terminal and, in that case, the antenna table may be updated according to the number of the antenna pattern which depends on the latest measurement result.

It should be noted that, when the terminal 2 measures the reception power by switching the antenna patterns for each frame, the terminal 2 may not succeed in demodulating the frame because the reception power is too low depending on the antenna patterns, and as a result, the terminal 2 may not be able to identify the source terminal that transmitted the frame. In this case, an antenna pattern with the lowest reception power cannot be selected. However, it is possible to receive the downlink transmission frame with high reliability while suppressing to the extent possible the reception of an interference signal from the terminal that performs full-duplex uplink transmission through using the antenna pattern with the lowest reception power amongst the antenna patterns with which demodulation was successful.

The frame sequence diagram according to this embodiment is the same as in FIG. 9. The operations different from those of the first or second embodiment will be mainly described hereinbelow. When the terminal 2 receives the FD trigger frame from the access point 11 (A4), the terminal 2 recognizes that the terminal 2 itself is the reception target terminal of full-duplex downlink frame and that the terminal 1 is given permission to perform full-duplex uplink transmission. The terminal 2 identifies the antenna pattern number corresponding to the terminal 1 on the basis of the antenna table, and switches the setting of the antenna to the antenna pattern of the identified number. The terminal 2 receives the full-duplex downlink frame transmitted to the terminal 2 itself after the lapse of the SIFS from the reception of the FD trigger frame with the antenna pattern after the switching (A6).

Also, in the above description, the directional pattern with the lowest reception power is selected for each peripheral terminal (terminal 1 or the like), but it is also possible to further utilize the reception power of the frame received from the access point 11 to select the directional pattern. For example, the terminal 2 receives frames transmitted from the access point 11 with each of the antenna patterns by opportunistic listening. The terminal 2 holds in a memory device or the like the number of the antenna pattern with which the reception was successful or reception was performed with the reception power not less than the threshold. When the terminal 2 determines the antenna pattern for the peripheral terminal (terminal 1, etc.), the terminal 2 selects the antenna pattern with the lowest reception power from the terminal 1 among the antenna patterns having the numbers held with regard to the access point 11. By virtue of this, the terminal 2 is allowed to more reliably receive the frame addressed to the terminal 2 and transmitted by downlink transmission from the access point 11 at the time of full-duplex communication.

Figure 15:
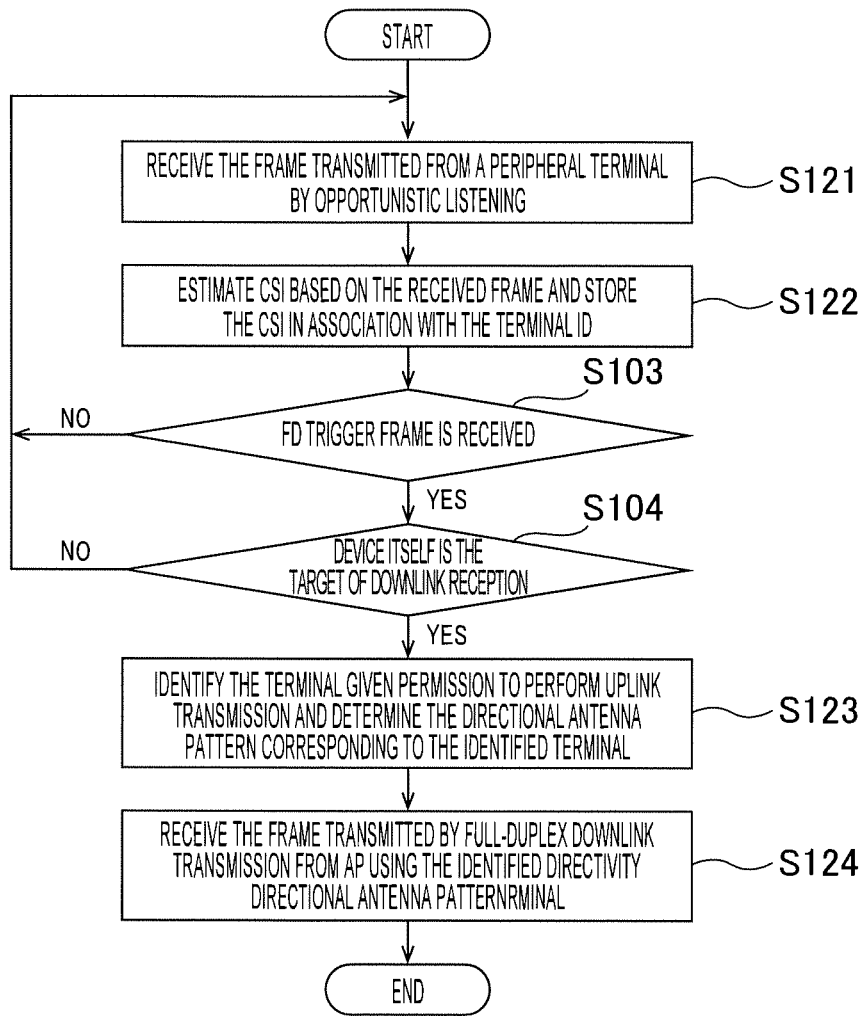
FIG. 15 is a flowchart of the operation of the terminal according to the third embodiment.

FIG. 15 is a flowchart of the operation of the terminal 2 according to this embodiment. The terminal 2 switches among a plurality of antenna patterns and receives a frame transmitted from a peripheral terminal by opportunistic listening (S121). The terminal 2 associates the number of the antenna pattern having the smallest reception power with, for example, the terminal ID of the transmission source terminal, and stores it in the antenna table (S122). Prior to receiving the FD trigger frame from the access point 11, the terminal 2 repeats this operation (NO in S103).

Upon receiving the FD trigger frame from the access point 11 (YES in S103), the terminal 2 analyzes the FD trigger frame and thereby checks whether or not the terminal 2 itself has been specified as the target of full-duplex downlink reception (S104). When the terminal 2 is not specified as the target (NO in S104), the process goes back to the step S101.

On the other hand, when the terminal 2 is specified as the target (YES in S104), the terminal 2 identifies the terminal given permission to perform full-duplex uplink transmission on the basis of the result of analysis of the FD trigger frame. In addition, the terminal 2 determines the antenna pattern corresponding to the identified terminal from the antenna table (S123).

The terminal 2 sets the antenna to the identified antenna pattern and receives the data frame transmitted by downlink transmission from the access point 11 after the SIFS since the completion of reception of the FD trigger frame (S124). By virtue of this, the terminal 2 can highly reliably receive the data frame transmitted from the access point 11 in a state in which the interference from the signal transmitted by uplink transmission from the identified terminal is reduced.

As has been described above, according to this embodiment, the terminal 2 receives the full-duplex downlink frame in a state where the antenna is set to the antenna pattern in which the reception power of the frame transmitted from the terminal (terminal 1) that is given permission to perform full-duplex uplink transmission is the smallest or as small as possible. As a result, the terminal 2 can receive the full-duplex downlink frame in a state where the influence of the interference from the terminal 1 is reduced as much as possible.

(Fourth Embodiment)

According to the first and second embodiments, the CSI is estimated based on the frame received by opportunistic listening. According to the fourth embodiment, however, instead of this, the terminal 2 estimates the CSI in relation to the terminal 1 and the CSI in relation to the access point 11 by using the frames to be transmitted by full-duplex transmission (the frame transmitted by uplink transmission from the terminal 1 to the access point 11 and the frame transmitted by downlink transmission from the access point 11 to the terminal the terminal 2). It should be noted that the terminal 2 includes a plurality of antennas in the same manner as in the first and second embodiments.

Specifically, the CSI in relation to the terminal 1 is estimated using the known signal sequence (preamble) section stored in the physical header of the full-duplex uplink transmission frame that the terminal 1 transmits to the access point 11. Also, the CSI in relation to the access point 11 is estimated using the known signal sequence (preamble) section stored in the physical header of the full-duplex downlink transmission frame that the access point 11 transmits to the terminal 2. Here, these preamble sections are configured to be orthogonal to each other. Accordingly, the terminal 2 can individually identify the preamble signals simultaneously received from the terminal 1 and the access point 11. With regard to the mode of orthogonalization of the preamble sections, the preamble patterns may be orthogonal to each other in terms of any one of space, frequency, and time (details of the orthogonalization will be described later). It should be noted that the preamble signal is arranged, as an example, in a physical header (PHY header) which is arranged at the beginning side of the MAC frame. In the field before the preamble signal in the physical header, it is assumed that the same signal defined by the specification or the standard is transmitted from the terminal 1 and the access point 11, and the terminal 2 can decode it even if these signals are simultaneously received. Further, since these preamble signals are orthogonal to each other, the terminal 2 can individually detect the preamble signals simultaneously received from the terminal 1 and the access point 11.

In order to make the preamble sections orthogonal to each other, the access point 11 notifies the terminal 1 that the terminal 1 is given permission to perform full-duplex uplink transmission by the FD trigger frame, and notifies the terminal 1 about the information identifying the preamble pattern (uplink preamble pattern) to be used in the preamble section of the physical header of the frame to be transmitted by uplink transmission. By analyzing the FD trigger frame, the terminal 1 recognizes that the terminal 1 itself is the full-duplex uplink transmission terminal and also recognizes the preamble pattern to be used in the full-duplex uplink transmission frame. The terminal 1 generates a frame to which a physical header including a preamble section according to the information of the notified preamble pattern is added, and transmits the generated frame after the lapse of the SIFS from the completion of reception of the FD trigger frame.

In addition, the access point 11 notifies the terminal 2 that the terminal 2 is the full-duplex downlink reception terminal by FD trigger frame, and also notifies the terminal 2 about the information on the preamble pattern (downlink preamble pattern) used in the preamble section of the physical header of the frame which the access point 11 transmits by full-duplex downlink transmission.

The terminal 2 receives and analyzes the FD trigger frame and thereby can identify in advance the preamble pattern used in the preamble section of the physical header of the frame transmitted by full-duplex downlink transmission to the terminal 2, and the preamble pattern used in the preamble section of the physical header of the frame transmitted by full-duplex uplink transmission by the terminal 1 to the access point 11. In addition, the terminal 2 is allowed to recognize in advance the fact that these preamble patterns are orthogonal to each other. Accordingly, the terminal 2 is capable of estimating the CSI in relation to the terminal 1 and the CSI in relation to the access point 11, respectively, using the respective preamble sections even when the terminal 2 simultaneously receives the frame transmitted by uplink transmission from the terminal 1 and the frame transmitted by downlink transmission from the access point 11 to the terminal 2 in the full-duplex communications.

The operation after estimation of the both pieces of CSI is the same as in the first embodiment or the second embodiment. Specifically, in the case of performing the same operation as in the first embodiment, the signal after the preamble section of the frame transmitted from the access point 11 is received while suppressing the influence of interference caused by the signal after the preamble section of the transmitted frame transmitted from the access point 11 by performing reception beamforming for forming a directional beam such that a null is directed toward the terminal 1 based on the CSI in relation to the terminal 1. In the case of performing the same operation as in the second embodiment, reception beamforming is performed that directs a null toward the terminal 1 and forms a directional beam so as to increase the gain for the access point 11 on the basis of the CSI in relation to the terminal 1 and the CSI in relation to the access point 11. By virtue of this, it is made possible to receive the signal after the preamble section of the frame transmitted from the access point 11 with a high gain while suppressing the influence of the interference by the signal after the preamble section of the frame transmitted from the terminal 1.

In the above-described embodiment, the preamble patterns used by the terminal 1 and the access point 11 are explicitly notified by the FD trigger frame, but the preamble patterns may be defined in accordance with the system specification or the standard such that the preamble pattern used in the frame for the full-duplex uplink transmission and the preamble pattern used in the full-duplex downlink transmission are orthogonal to each other. In this case, the terminal 1 and the access point 11 should each perform full-duplex uplink transmission and full-duplex downlink transmission using a predetermined preamble pattern. The terminal 2 should also estimate the CSI in relation to the terminal 1 and the CSI in relation to the access point using the preamble pattern for the full-duplex uplink and the preamble pattern for the dull duplex downlink predetermined in advance. Accordingly, in this case, a configuration may be adopted in which information of the preamble pattern is not notified by the FD trigger frame.

Here, the orthogonality of the preamble sections will be described in detail. As an orthogonalization method of the preamble sections, spatial, frequency and temporal approaches are considered. In the case of time orthogonality, the preamble section is divided into multiple blocks and the preamble signals of the terminal 1 and the access point 11 are transmitted in different blocks. In one block, only either of them transmits a preamble signal. In other words, while the terminal 1 transmits the preamble signal, the access point 11 does not transmit anything. The combination of a block in which transmission should be made among the multiple blocks and the signal to be transmitted by the block corresponds to the preamble pattern. In the case of frequency orthogonality, the terminal 1 and the access point 11 transmit preamble signals at frequencies orthogonal to each other. The combination of the frequencies and the signals to be transmitted at these frequencies corresponds to the preamble pattern. In the case of spatial orthogonality, the terminal 1 and the access point 11 transmit preamble signals in which value strings included in mutually different rows (or different columns) of orthogonal matrix are arranged, respectively. The rows (or columns) of the orthogonal matrix are orthogonal to each other. Each row or column of the orthogonal matrix corresponds to the preamble pattern. In any orthogonalization methods, the terminal 2 can distinguish the preamble signals of the terminal 1 and the access point 11.

Figure 16:
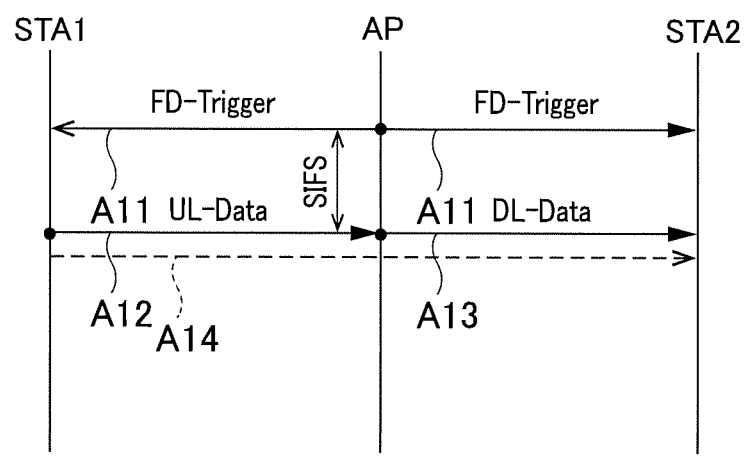
FIG. 16 is a diagram illustrating an example of a frame sequence according to the fourth embodiment.

FIG. 16 illustrates an example of a frame sequence according to this embodiment. Unlike the first to third embodiments, there is no sequence for frame reception by opportunistic listening.

The access point 11 sets, in corresponding fields in the Control field of the FD trigger frame, (i) information specifying the terminal 1 to be given permission to perform full-duplex uplink transmission, (ii) information specifying a preamble pattern (uplink preamble pattern) to be used at the time of uplink transmission to the terminal 1, (iii) information specifying the terminal 2 to be the target of full-duplex downlink transmission, and (iv) information indicating the preamble pattern (downlink preamble pattern) used by the access point 11 in downlink transmission. The access point 11 transmits the FD trigger frame with these pieces of information set therein (A 11).

The terminal 1 receives the FD trigger frame (A11), analyzes the FD trigger frame, recognizes that the terminal 1 itself has been given permission to perform uplink transmission, and identifies the preamble pattern to be used at the time of uplink transmission. The terminal 1 transmits a data frame, in which the identified preamble pattern is set in the preamble section, by full-duplex uplink transmission after the lapse of the SIFS since the reception of the FD trigger frame was completed (A12).

The access point 11 performs full-duplex downlink transmission of the data frame, in which the downlink preamble pattern notified by the FD trigger frame is set in the preamble section, to the terminal 2 after the lapse of the SIFS from the completion of transmission of the FD trigger frame (A13).

The terminal 2 receives the FD frame (A 11), analyzes the FD trigger frame, and thereby recognizes the fact that the terminal 2 itself has been specified as the target of full-duplex downlink reception, and recognizes the uplink preamble pattern used by the terminal 1 and the downlink preamble pattern used by the access point 11. The terminal 2 simultaneously receives the frame transmitted by uplink transmission from the terminal 1 and the frame transmitted by downlink transmission from the access point 11 after the lapse of the SIFS from the completion of reception of the FD frame (A 14, A 13).

The terminal 2 estimates the CSI in relation to the terminal 11 by using the preamble section of the frame received from the terminal 11 and the uplink preamble pattern identified in advance from these simultaneously received frames. Also, the CSI in relation to the access point 11 is estimated using the preamble section of the frame received from the access point 11 and the downlink preamble pattern identified in advance. The operation after estimation of these pieces of CSI is as described above. Specifically, in the case of performing the same operation as in the first embodiment, reception of the frame transmitted from the access point 11 is performed by performing reception beamforming for forming a directional beam such that a null is directed toward the terminal 1 based on the CSI in relation to the terminal 1, In the case of performing the same operation as in the second embodiment, reception of the frame transmitted from the access point 11 is performed by performing reception beamforming that directs a null toward the terminal 1 and forms a directional beam so as to increase the gain for the access point 11 on the basis of the CSI in relation to the terminal 1 and the CSI in relation to the access point 11.

Figure 17:
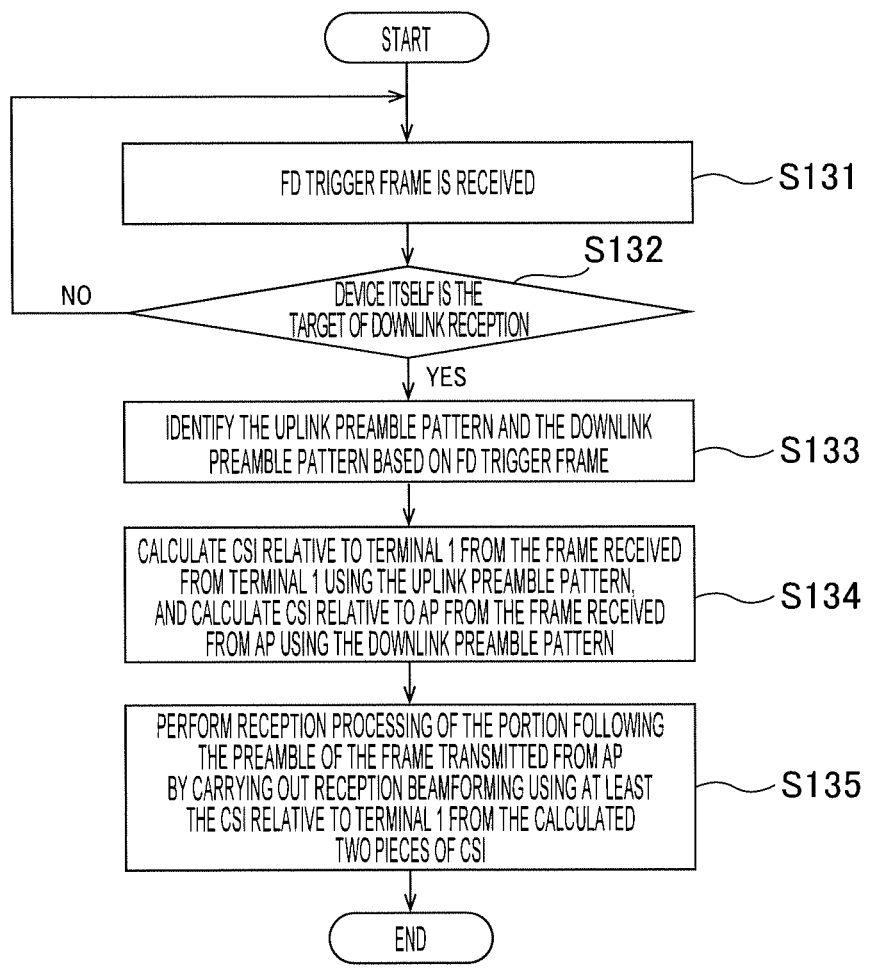
FIG. 17 is a flowchart of the operation of the terminal according to the fourth embodiment.

FIG. 17 is a flowchart of the operation of the terminal 2 according to this embodiment. The terminal 2 receives an FD trigger frame transmitted from the access point 11 (S131). The terminal 2 checks whether or not the terminal 2 itself is specified as the target of full-duplex downlink reception by analyzing the FD trigger frame (S132). When the terminal 2 itself is not specified as the target (NO in S132), the process is terminated. When the terminal 2 is specified as the target (YES in S132), the terminal 2 recognizes the uplink preamble pattern and the downlink preamble pattern on the basis of the result of analysis of the FD trigger frame (S133). Further, the terminal 2 may recognize the terminal (terminal 1) given permission to perform uplink transmission.

The terminal 2 receives the frame transmitted by uplink transmission from the terminal 1 to the access point 11, and the data frame transmitted by downlink transmission to the terminal 2 from the access point 11 after the SIFS since the completion of reception of the FD trigger frame (S134). The terminal 2 calculates the CSI in relation to the terminal 1 on the basis of the preamble section of the frame received from the terminal 1 using the uplink preamble pattern. Also, the terminal 2 calculates the CSI in relation to the access point 11 on the basis of the preamble section of the frame received from the access point 11 using the downlink preamble pattern.

The terminal 2 performs reception beamforming using at least the CSI in relation to the terminal 1 among the calculated pieces of CSI and thereby performs reception processing of the portion (fields) following the preamble section of the frame transmitted from the access point 11 (S135). Details of reception beamforming are as described above. As a result, the terminal 2 can highly reliably receive the data frame transmitted from the access point 11 in a state in which the interference from the signal transmitted by uplink transmission from the terminal 1 is reduced.

As has been described above, according to this embodiment, in contrast to the first and second embodiments, there is no need to estimate and hold the pieces of CSI for the number of peripheral terminals, so that it is made possible to reduce the required memory capacity and achieve low power consumption. In addition, since the CSI can be estimated by using the frames from the terminal 1 and the access point 11 received by full duplex communications and thus reception beamforming can be performed, the influence of channel variations can be suppressed and minimized (it is made possible to achieve better beam formation). Specifically, according to the first and second embodiments, a certain amount of time elapses in most cases from CSI estimation with opportunistic listening until actual reception beamforming. As a result, if the weight coefficient calculated using the estimated CSI is applied, it may happen that optimal beam formation may not be realized for the temporal variation of the channel. On the other hand, according to this embodiment, it is made possible to minimize the influence of such channel variations.

(Fifth Embodiment)

Figure 18:
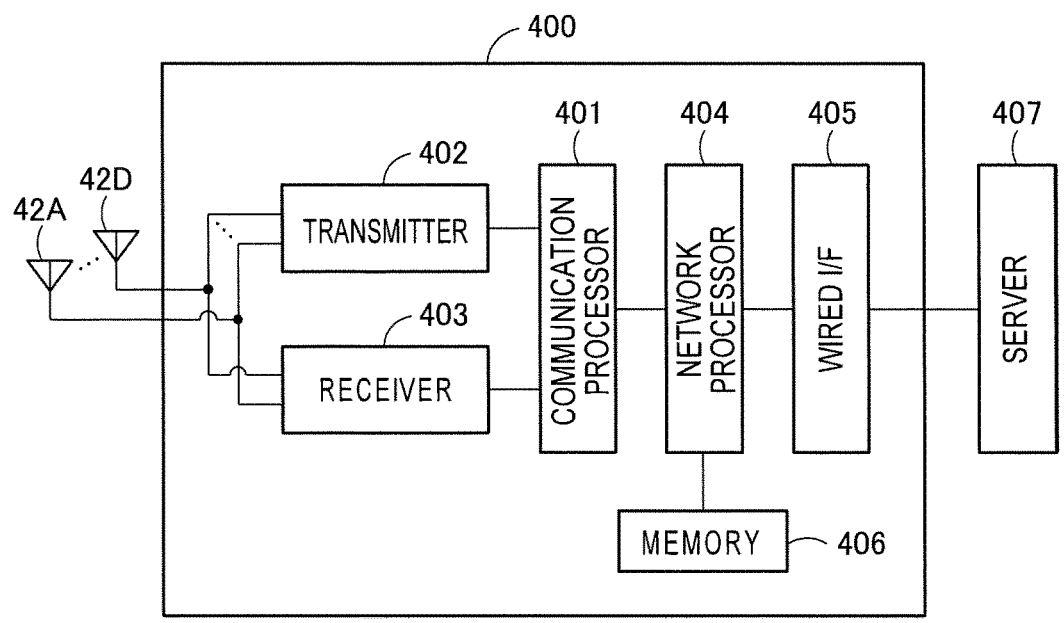
FIG. 18 is a functional block diagram of the access point or the terminal.

FIG. 18 is a functional block diagram of a base station (access point) 400 according to the second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The communication processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program)

by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 18. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

(Sixth Embodiment)

Figure 19:
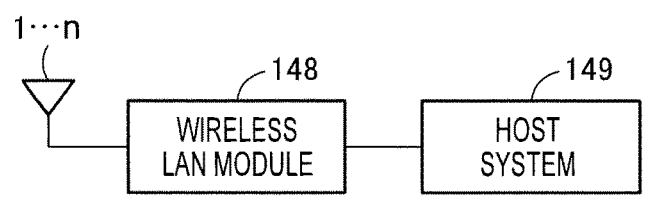
FIG. 19 is a diagram illustrating an overall configuration of a terminal or an access point.

FIG. 19 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 20:
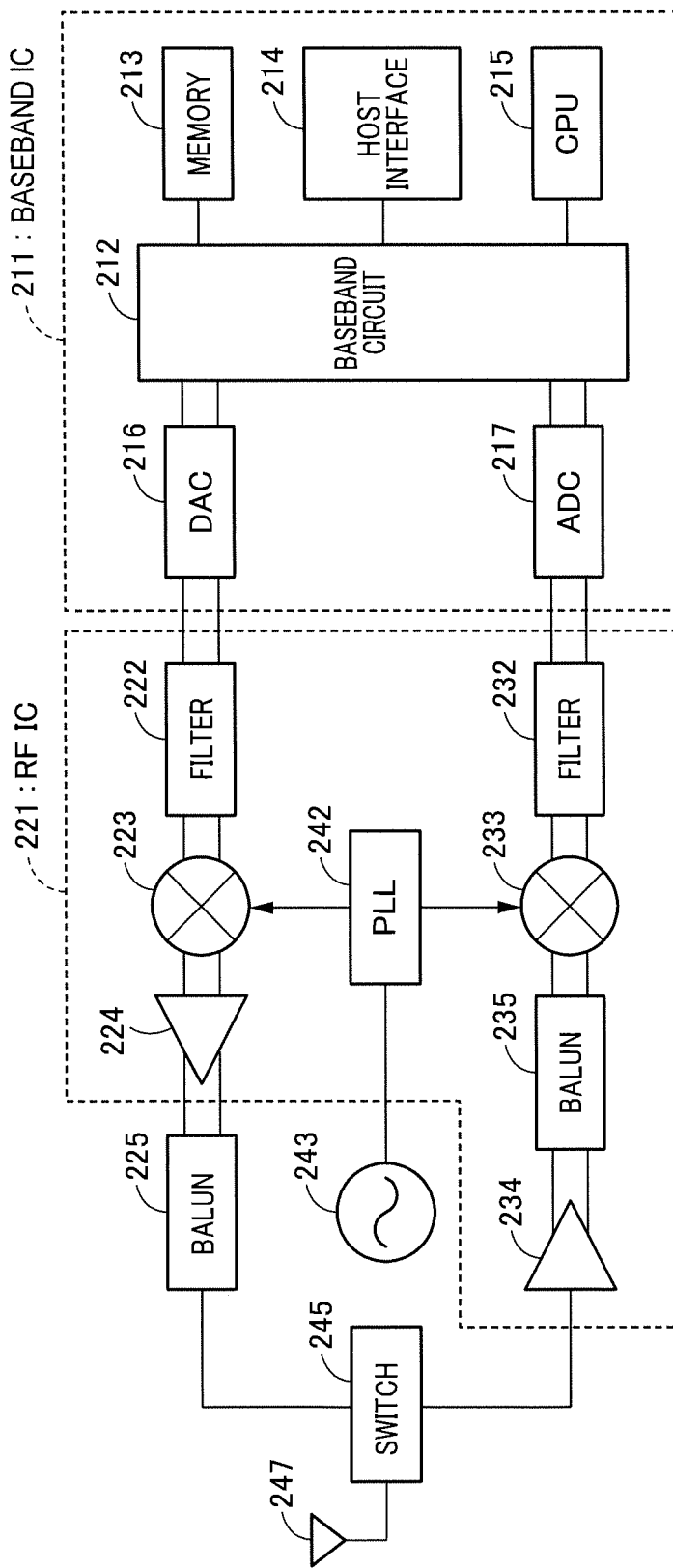
FIG. 20 is a diagram illustrating a hardware configuration example of a wireless communication device incorporated in the terminal or the access point.

FIG. 20 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples of the wireless communication device as described in the above-stated any embodiment. In the configuration shown in figure, at least one antenna 247 is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Processing of the controller 25 and the self-interference cancelling function in FIG. 6 is carried out in the baseband circuit 212 as one example. A circuit performing the self-interference cancelling function may be arranged in the RF IC 221 side. The antenna 247 may be a variable directional antenna. In this case, switching control of directional patterns may be carried out in the baseband circuit 212 or CPU 215 or the like.

(Seventh Embodiment)

Figure 21:
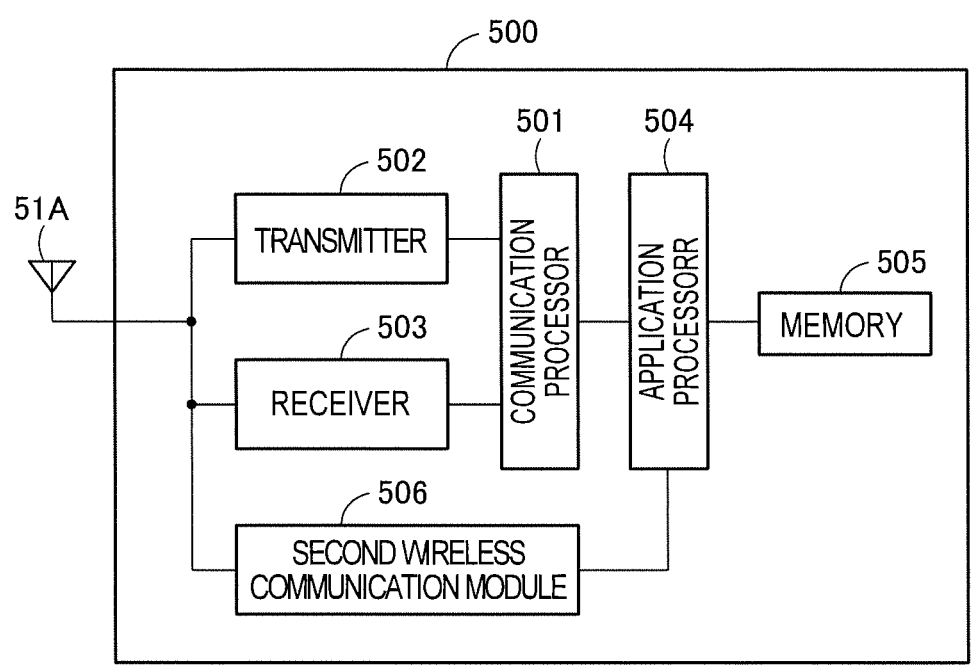
FIG. 21 is a functional block diagram of the terminal or the access point.

FIG. 21 is a functional block diagram of the terminal (STA) 500 according to a fourth embodiment. The STA 500 includes a communication processor 501, a transmitter 502, a receiver 503, an antenna 51A, an application processor 504 a memory505, and a second wireless communication module506. The base station (AP) may have the similar configuration.

The communication processor 501 has the functions similar to the controller as described in the first embodiment. The transmitter 502 and the receiver 503 have the functions similar to the transmitter and the receiver as described in the first embodiment. The transmitter 502 and the receiver 503 may perform analog domain processing in the transmitter and the receiver as described in the first embodiment and the communication processor 501 may perform digital domain processing in the transmitter and the receiver as described in the first embodiment. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 has the similar configuration to the WLAN module as shown in FIG. 19 or FIG. 20 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

(Eighth Embodiment)

Figure 22A:
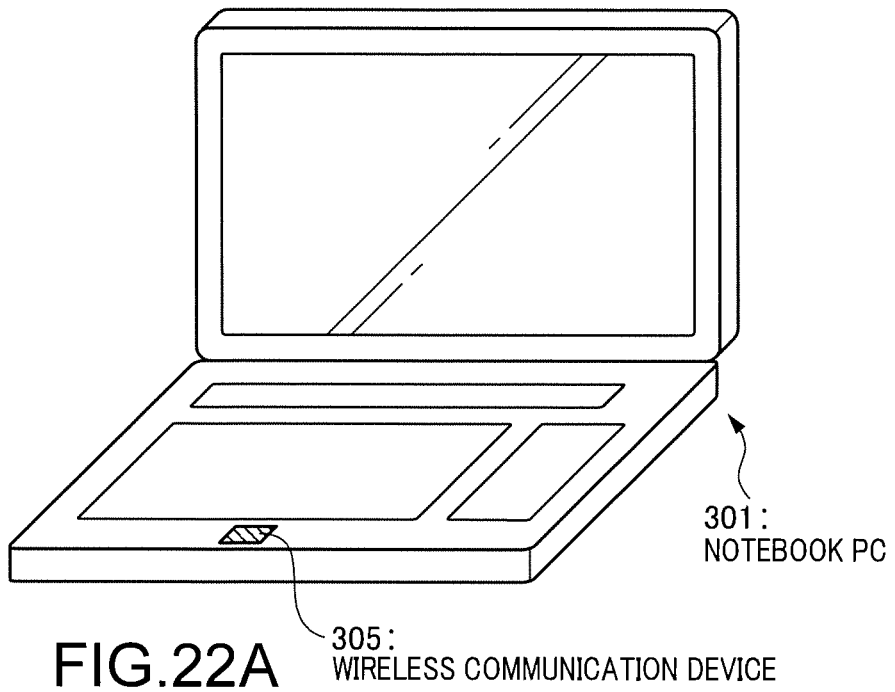
FIG. 22A and FIG. 22B each shows a perspective view of a terminal according to an embodiment of the present invention.
Figure 22B:
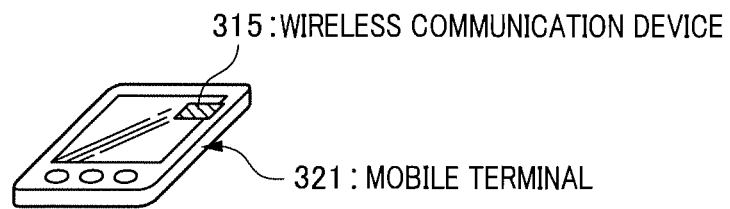

FIG. 22A and FIG. 22B are perspective views of wireless terminal according to the third embodiment. The wireless terminal in FIG. 22A is a notebook PC 301 and the wireless communication device (or a wireless device) in FIG. 22B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 23:
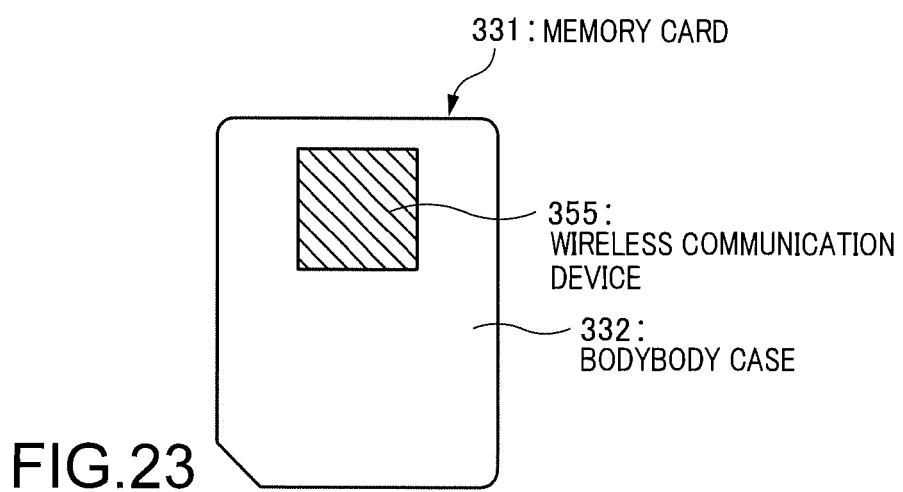
FIG. 23 is a diagram illustrating a memory card according to an embodiment of the present invention.

Moreover, a wireless communication device installed in a terminal (which may indicate a base station) can also be provided in a memory card. FIG. 23 illustrates an example of a wireless communication device mounted on a memory card. A memory card 331 contains a wireless communication device 355 and a body case 332. The memory card 331 uses the wireless communication device 355 for wireless communication with external devices. Here, in FIG. 23, the description of other installed elements (for example, a memory, and so on) in the memory card 331 is omitted.

(Ninth Embodiment)

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

(Tenth Embodiment)

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

(Eleventh Embodiment)

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

(Twelfth Embodiment)

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

(Thirteenth Embodiment)

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

(Fourteenth Embodiment)

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

(Fifteenth Embodiment)

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

(Sixteenth Embodiment)

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

(Seventeenth Embodiment)

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type.

The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 24:
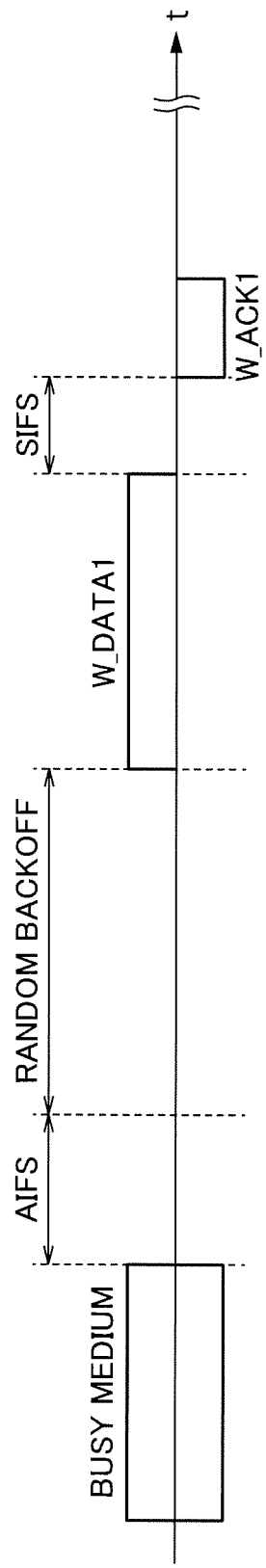
FIG. 24 is a diagram illustrating an example of frame exchange in a contention period.

Here, FIG. 24 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on.

According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. An electronic apparatus comprising:
a receiver configured to receive a first frame from a first electronic apparatus in a first frequency band; and
controlling circuitry configured to acquire channel information between the first electronic apparatus and the electronic apparatus by performing channel estimation based on the first frame,
wherein
the receiver is configured to receive a second frame from a second electronic apparatus,
the controlling circuitry is configured to calculate, using the channel information, weight coefficients for a plurality of antennas to suppress reception of a signal from the first electronic apparatus, and the receiver is configured to receive, using the weight coefficients, a third frame in the first frequency band from the second electronic apparatus after a first period from transmission of the second frame, wherein the second frame is a frame to instruct frame transmission from the first electronic apparatus to the second electronic apparatus in the first frequency hand after the first period from the transmission of the second frame, and to notify that frame transmission is to be performed from the second electronic apparatus to the electronic apparatus after the first period from the transmission of the second frame.

2. The electronic apparatus according to claim 1, wherein the controlling circuitry is configured to calculate the weight coefficients to form a directional pattern directing a null toward the first electronic apparatus.

3. The electronic apparatus according to claim 1, wherein the controlling circuitry is configured to obtain channel information between the second electronic apparatus and the electronic apparatus by performing channel estimation based on the second frame or a fourth frame received from the second electronic apparatus, and configured to calculate the weight coefficients for the plurality of antennas using, in addition to the channel information between the first electronic apparatus and the electronic apparatus, the channel information between the second electronic apparatus and the electronic apparatus, the weight coefficients being for use in suppressing reception of the signal from the first electronic apparatus and in increasing a gain of the signal from the second electronic apparatus, and the receiver is configured to receive the third frame by using the calculated weight coefficients.

4. The electronic apparatus according to claim 3, wherein the controlling circuitry is configured to calculate the weight coefficients for the antennas to form a directional pattern that directs a null toward the first electronic apparatus and has a directionality with respect to the second electronic apparatus.

5. The electronic apparatus according to claim 1, wherein a destination of the first frame is the second electronic apparatus.

6. The electronic apparatus according to claim 1 further comprising the antennas.

7. An electronic apparatus comprising:

a receiver configured to receive a first frame from a first electronic apparatus in a first frequency band with each of a plurality of directional patterns of a variable directional antenna; and controlling circuitry configured to select a directional pattern capable of suppressing reception of a signal from the first electronic apparatus from the directional patterns, the directional pattern being selected on the basis of reception powers of the first frame corresponding to the directional patterns, wherein the receiver is configured to receive a second frame from a second electronic apparatus, and the receiver is configured to receive a third frame in the first frequency band from the second electronic apparatus after a first period from transmission of the second frame, the third frame being received with the selected directional pattern.

8. The electronic apparatus according to claim 7, wherein the receiver is configured to switch at least two or more of the directional patterns during reception of the first frame.

9. The electronic apparatus according to claim 7, wherein the controlling circuitry is configured to select the directional pattern having a smallest reception power from the directional patterns.

10. The electronic apparatus according to claim 7, wherein the second frame is a frame to instruct frame transmission from the first electronic apparatus to the second electronic apparatus in the first frequency band after the first period from the transmission of the second frame, and to notify that frame transmission is to be performed from the second electronic apparatus to the electronic apparatus in the first frequency band after the first period from the transmission of the second frame.

11. The electronic apparatus according to claim 7 further comprising a plurality of the variable directional antennas.

12. A electronic apparatus comprising:

a receiver configured to receive a first frame from a first electronic apparatus, wherein the first frame includes information specifying a second electronic apparatus that is to transmit a frame after a first period from transmission of the first frame and information specifying the electronic apparatus that is to receive a frame after the first period from the transmission of the first frame and configured to simultaneously receive, after reception of the first frame, a second frame from the second electronic apparatus in a first frequency band and a third frame from the first electronic apparatus in the first frequency band, wherein a preamble section of the second frame and a preamble section of the third frame are orthogonal to each other; and controlling circuitry configured to acquire channel information between the second electronic apparatus and the electronic apparatus by performing channel estimation on the basis of the preamble section of the second frame, wherein the controlling circuitry is configured to calculate, using the channel information, weight coefficients for the plurality of antennas, the weight coefficients being for use in suppressing reception of a portion of the second frame following the preamble section of the second frame, and the receiver is configured to receive a portion of the third frame following the preamble section of the third frame, on the basis of the weight coefficients.

13. The electronic apparatus according to claim 12, wherein the controlling circuitry is configured to obtain channel information between the first electronic apparatus and the electronic apparatus by performing channel estimation based on the preamble section of the third frame, and the controlling circuitry is configured to calculate the weight coefficients for the antennas to suppress reception of the portion of the second frame following the preamble section of the second frame and increase a gain of a signal of the portion of the third frame following the preamble section of the third frame.

14. The electronic apparatus according to claim 13, wherein the controlling circuitry is configured to calculate the weight coefficients for the antennas to form a directional pattern directing a null toward the second electronic apparatus and having a directionality with respect to the first electronic apparatus.

15. The electronic apparatus according to claim 12, wherein the first frame includes information specifying a value of the preamble section used in the second frame from the second electronic apparatus and information specifying a value of the preamble section used in the third frame from the first electronic apparatus.

16. The electronic apparatus according to claim 12 further comprising the antennas.

17. A wireless communication method performed in an electronic apparatus, comprising:
- receiving a first frame from a first electronic apparatus in a first frequency band;
- acquiring channel information between the first electronic apparatus and the electronic apparatus by performing channel estimation based on the first frame;
- receiving a second frame from a second electronic apparatus;
- calculating, using the channel information, weight coefficients for a plurality of antennas to suppress reception of a signal from the first electronic apparatus; and
- receiving, using the weight coefficients, a third frame in the first frequency band from the second electronic apparatus after a first period from transmission of the second frame,
- wherein the second frame is a frame to instruct frame transmission from the first electronic apparatus to the second electronic apparatus in the first frequency band after the first period from the transmission of the second frame, and to notify that frame transmission is to be performed from the second electronic apparatus to the electronic apparatus after the first period from the transmission of the second frame.

18. A wireless communication method comprising:
- receiving a first frame from a first electronic apparatus in a first frequency band with each of a plurality of directional patterns of a variable directional antenna;
- selecting a directional pattern capable of suppressing reception of a signal from the first electronic apparatus from the directional patterns, the directional pattern being selected on the basis of reception powers of the first frame corresponding to the directional patterns;
- receiving a second frame from a second electronic apparatus; and
- receiving a third frame in the first frequency band with the selected directional pattern from the second electronic apparatus after a first period from transmission of the second frame.

19. A wireless communication method performed in an electronic apparatus comprising:
- receiving a first frame from a first electronic apparatus, wherein the first frame includes information specifying a second electronic apparatus that is to transmit a frame after a first period from transmission of the first frame and information specifying the electronic apparatus that is to receive a frame after the first period from the transmission of the first frame;
- simultaneously receiving, after reception of the first frame, a second frame from the second electronic apparatus in a first frequency band and a third frame from the first electronic apparatus in the first frequency band, wherein a preamble section of the second frame and a preamble section of the third frame are orthogonal to each other;
- acquiring channel information between the second electronic apparatus and the electronic apparatus by performing channel estimation on the basis of the preamble section of the second frame;
- calculating, using the channel information, weight coefficients for the plurality of antennas, the weight coefficients being for use in suppressing reception of a portion of the second frame following the preamble section of the second frame; and
- receiving a portion of the third frame following the preamble section of the third frame, on the basis of the weight coefficients.

* * * * *